(12) United States Patent
Terao

(10) Patent No.: US 10,070,001 B2
(45) Date of Patent: Sep. 4, 2018

(54) DOCUMENT READING APPARATUS, METHOD FOR CONTROLLING DOCUMENT READING APPARATUS, AND STORAGE MEDIUM

(71) Applicant: CANON KABUSHIKI KAISHA, Tokyo (JP)

(72) Inventor: Yoshihide Terao, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/091,457

(22) Filed: Apr. 5, 2016

(65) Prior Publication Data

US 2016/0301825 A1 Oct. 13, 2016

(30) Foreign Application Priority Data

Apr. 9, 2015 (JP) .................. 2015-080443

(51) Int. Cl.
*H04N 1/32* (2006.01)
*G06K 9/78* (2006.01)
*G06F 17/30* (2006.01)
*H04N 1/04* (2006.01)

(52) U.S. Cl.
CPC ... *H04N 1/32128* (2013.01); *G06F 17/30011* (2013.01); *G06F 17/3012* (2013.01); *G06K 9/78* (2013.01); *H04N 1/04* (2013.01); *G06K 2209/01* (2013.01); *H04N 2201/0094* (2013.01); *H04N 2201/3229* (2013.01); *H04N 2201/3277* (2013.01)

(58) Field of Classification Search
CPC ........ H04N 1/32128; H04N 2201/3229; G06F 17/30011; G06F 17/3012; G06K 9/78; G06K 2209/01

USPC ....... 358/538, 530, 1.9, 1.18, 1.16; 715/229; 707/694, 695, 696
See application file for complete search history.

(56) References Cited

U.S. PATENT DOCUMENTS

| | | | |
|---|---|---|---|
| 2005/0063009 A1 | 3/2005 | Ehara | |
| 2006/0050302 A1* | 3/2006 | Sawaguchi | ......... G06F 17/3028 358/1.15 |
| 2010/0215272 A1 | 8/2010 | Isaev | |
| 2013/0054595 A1* | 2/2013 | Isaev | .................. G06K 9/00469 707/736 |
| 2013/0169985 A1 | 7/2013 | Inomata | |
| 2013/0268528 A1 | 10/2013 | Kawano | |
| 2014/0122479 A1 | 5/2014 | Panferov | |

(Continued)

FOREIGN PATENT DOCUMENTS

| | | |
|---|---|---|
| CN | 101005552 A | 7/2007 |
| CN | 101046730 A | 10/2007 |
| JP | 2005-56315 A | 3/2005 |

*Primary Examiner* — Jamares Q Washington
(74) *Attorney, Agent, or Firm* — Canon U.S.A., Inc. IP Division

(57) ABSTRACT

Conventionally, a user cannot give an instruction not to include predetermined information such as a date and time or a reception number in a file name of an image file. A method for controlling a document reading apparatus including a reading unit configured to read an image of a document to generate image data includes receiving an instruction not to set predetermined information as a file name of the image data generated by the reading unit, and, in a case where the instruction is received in the receiving, setting a file name not including the predetermined information.

12 Claims, 22 Drawing Sheets

(56) References Cited

U.S. PATENT DOCUMENTS

2014/0268246 A1* 9/2014 Ohguro ................ H04N 1/2166
  358/403
2014/0293362 A1* 10/2014 Kawakami ........... H04N 1/2166
  358/403

* cited by examiner

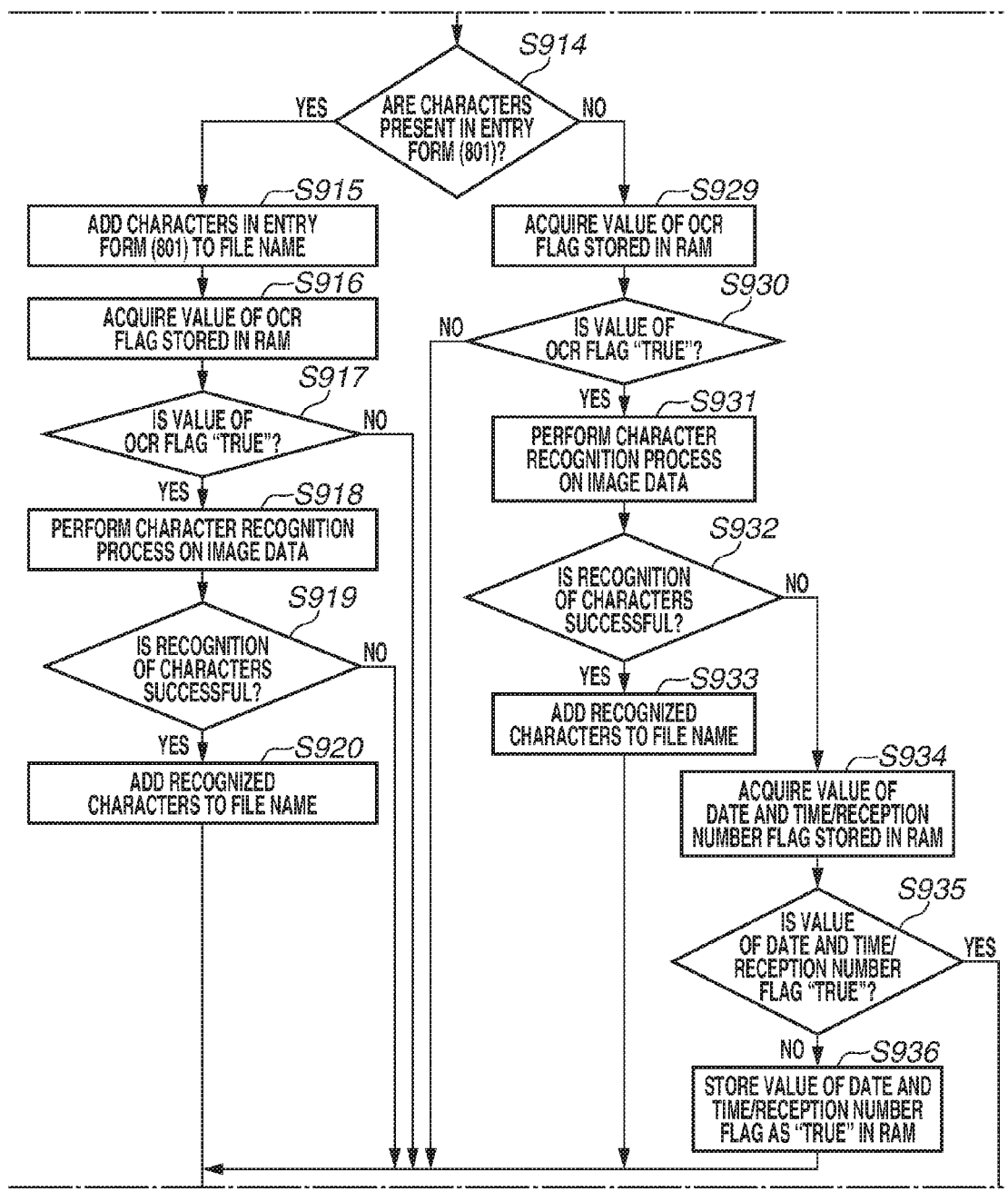

FIG.10

MINUTES

DATE AND TIME: JANUARY 1, 2014
PLACE: XX MEETING ROOM
PARTICIPANTS: A, B, AND C

CONTENT: XXXXXXXXXXXXXXX
XXXXXXXXXXXXXXXXXXXXXXX
XXXXXXXXXXXXXXXXXXXXXXX
XXXXXXXXXXXXXXXXXXXXXXX
XXXXXXXXXXXXXXXXXXXXXXX

ACTION ITEM: ZZZZZZZZZZZZZZZ
ZZZZZZZZZZZZZZZZZZZZZZZZZ
ZZZZZZZZZZZZZZZZZZZZZZZZZ
ZZZZZZZZZZZZZZZZZZZZZZZZZ
ZZZZZZZZZZZZZZZZZZZZZZZZZ

January 1_minutes.pdf 20140101103030.pdf minutes_20140101103030.pdf minutes.pdf

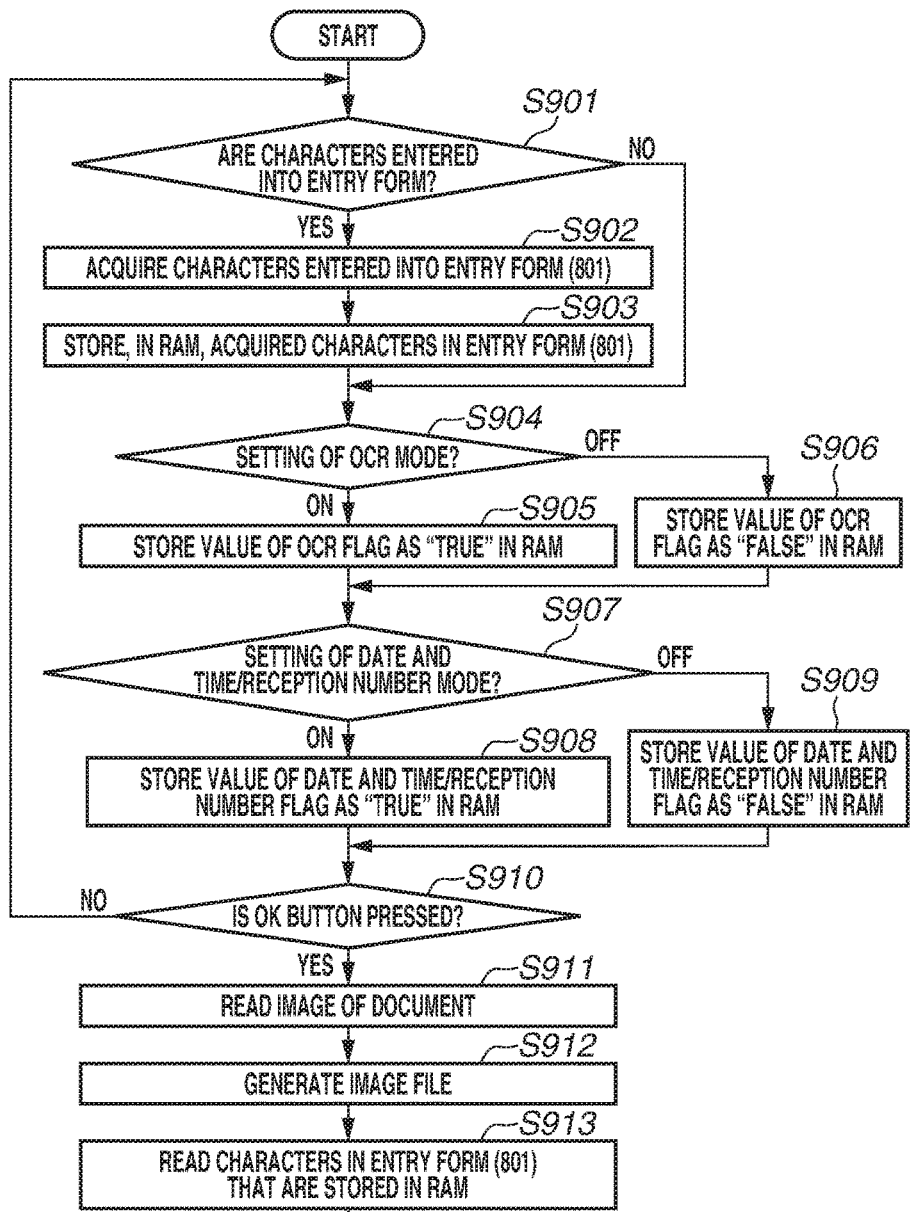

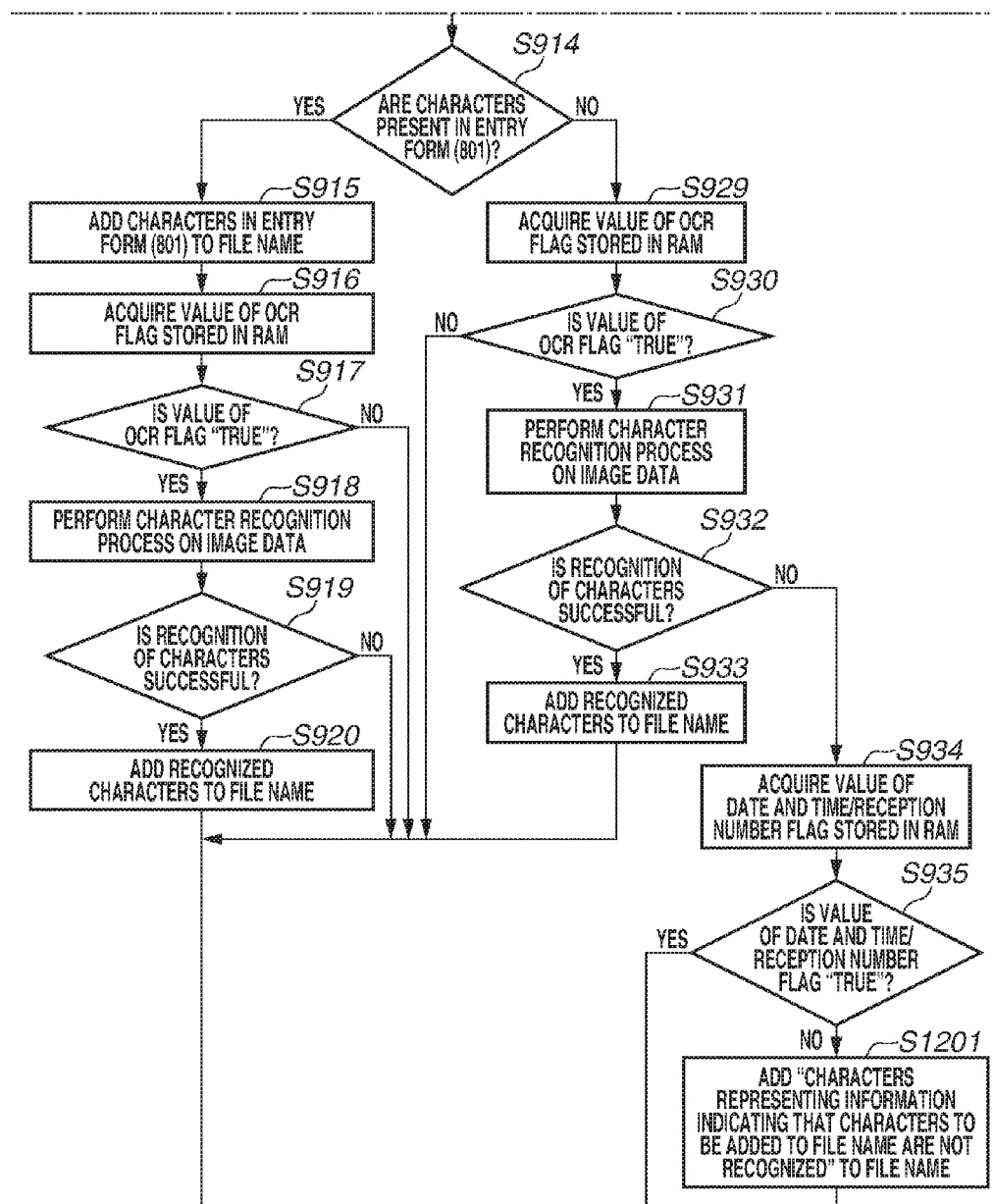

No OCR Name.pdf 20140101103030.pdf

DOCUMENT READING APPARATUS, METHOD FOR CONTROLLING DOCUMENT READING APPARATUS, AND STORAGE MEDIUM

BACKGROUND OF THE INVENTION

Field of the Invention

The present invention relates to a document reading apparatus for reading an image of a document, a method for controlling a document reading apparatus, and a storage medium.

Description of the Related Art

There is a document reading apparatus for automatically setting a file name for image data generated by reading an image of a document.

Japanese Patent Application Laid-Open No. 2005-56315 discusses a digital color multifunction peripheral for, when saving in a storage device an image file of image data read from a document by an image reading apparatus, automatically assigning a file name to the image file.

If a mode of performing a process of automatically assigning a file name to an image file (a file name automatic assignment mode) is set, this multifunction peripheral performs a character recognition process on the image of the image file. Then, if the file name automatic assignment mode is set and a character or a character string is recognized in the character recognition process, the multifunction peripheral automatically assigns, as the file name of the image file, the character or the character string recognized in the character recognition process. Further, if the file name automatic assignment mode is set and a character or a character string is not recognized in the character recognition process, the multifunction peripheral automatically assigns, as the file name of the image file, a character string including the date and time when the document was read, and further including a predetermined extension. If, on the other hand, the file name automatic assignment mode is not set, the multifunction peripheral automatically assigns, as the file name of the image file, a character string including the date and time when the document is read, and further including a predetermined extension.

If it is allowed to overwrite image files having the same file name, it is not necessary to set a file name including characters representing unique information such as a date and time or a reception number.

Conventionally, however, a user cannot give an instruction not to include characters representing unique information such as a date and time or a reception number in the file name of an image file.

Further, as another problem, if an instruction not to include characters representing unique information such as a date and time or a reception number in the file name of an image file is given, and if the file name of the image file does not include any character, the file name results in including only the extension. The image file of which the file name includes only the extension is treated as a hidden file by an operating system of a server. Thus, the user cannot easily find out a desired image file based on the file name.

SUMMARY OF THE INVENTION

According to an aspect of the present invention, a document reading apparatus includes a reading unit configured to read an image of a document to generate image data, a reception unit configured to receive an instruction not to set predetermined information as a file name of the image data generated by the reading unit, and a setting unit configured to, in a case where the reception unit receives the instruction, set a file name not including the predetermined information.

Further features of the present invention will become apparent from the following description of exemplary embodiments with reference to the attached drawings.

BRIEF DESCRIPTION OF THE DRAWINGS

FIG. 10 illustrates an example of a schematic diagram of a document to be read according to the first exemplary embodiment.

DESCRIPTION OF THE EMBODIMENTS

Exemplary embodiments of the present invention will be described in detail below with reference to the accompanying drawings. The following exemplary embodiments do not limit the present invention according to the appended claims, and not all the combinations of the features described in the exemplary embodiments are essential for a method for solving the problems in the present invention.

Figure 1:
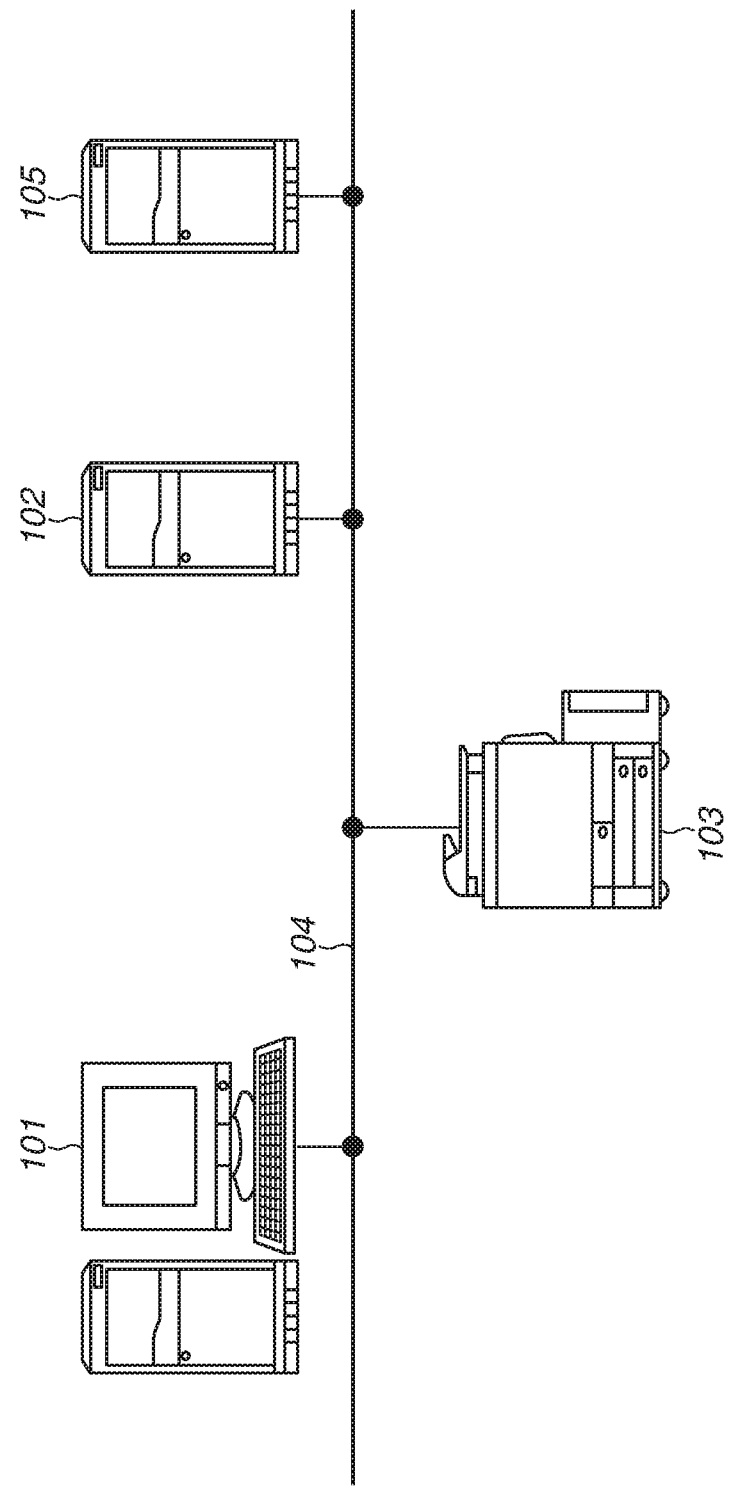
FIG. 1 is a diagram illustrating a configuration of a system according to the present exemplary embodiment.

With reference to a configuration diagram in FIG. 1, the configuration of a system according to a first exemplary embodiment of the present invention is described.

In the first exemplary embodiment, a document reading apparatus receives an instruction not to set characters representing unique information (e.g., a date and time or a reception number) as a file name of image data generated by reading an image of a document. Then, according to the reception of the instruction not to set characters representing unique information, the document reading apparatus sets a file name not including the characters representing unique information.

The details are described below.

The system according to the present exemplary embodiment includes a multifunction peripheral (MFP) 103, which is an example of a document reading apparatus, a personal computer (PC) 101, which is an example of an external apparatus, a file sharing server 102, and an electronic mail server 105.

The MFP 103 has an image reading function for reading a document to generate image data, and a print function (a copy function) for printing an image on a sheet based on the generated image data. The MFP 103 also has a print function (a PC print function) for receiving a print job from the external apparatus such as the PC 101 and printing a character and/or an image on a sheet based on data for which a print instruction is received. The printing performed by each print function may be color printing or monochrome printing.

The MFP 103 is connected to the PC 101, the file sharing server 102, and the electronic mail server 105 via a network 104.

The network 104 may be a local area network (LAN) or may be a wide area network (WAN) such as the Internet.

FIG. 1 illustrates an example of the system configuration in which a single PC 101 is connected to the MFP 103 via the network 104. The present invention, however, is not limited to this. Alternatively, the configuration may be such that a plurality of PCs 101 are connected to the MFP 103 via the network 104.

Further, FIG. 1 illustrates an example of the system configuration in which a single file sharing server 102 is connected to the MFP 103 via the network 104. The present invention, however, is not limited to this. Alternatively, the configuration may be such that a plurality of file sharing servers 102 are connected to the MFP 103 via the network 104.

Furthermore, FIG. 1 illustrates an example of the system configuration in which a single electronic mail server 105 is connected to the MFP 103 via the network 104. The present invention, however, is not limited to this. Alternatively, the configuration may be such that a plurality of electronic mail servers 105 are connected to the MFP 103 via the network 104.

For example, the PC 101 generates image data using application software and transmits the generated image data to the MFP 103. Further, for example, the PC 101 generates page description language (PDL) data using application software or a printer driver. Then, a controller unit (not illustrated) of the MFP 103 rasterizes the PDL data sent from the PC 101 via the network 104, thereby generating bitmap data.

In the present exemplary embodiment, the PC 101 is described as an example of the external apparatus. The present invention, however, is not limited to this. Alternatively, the external apparatus may be a mobile information terminal such as a personal digital assistant (PDA) or a smartphone.

Figure 2:
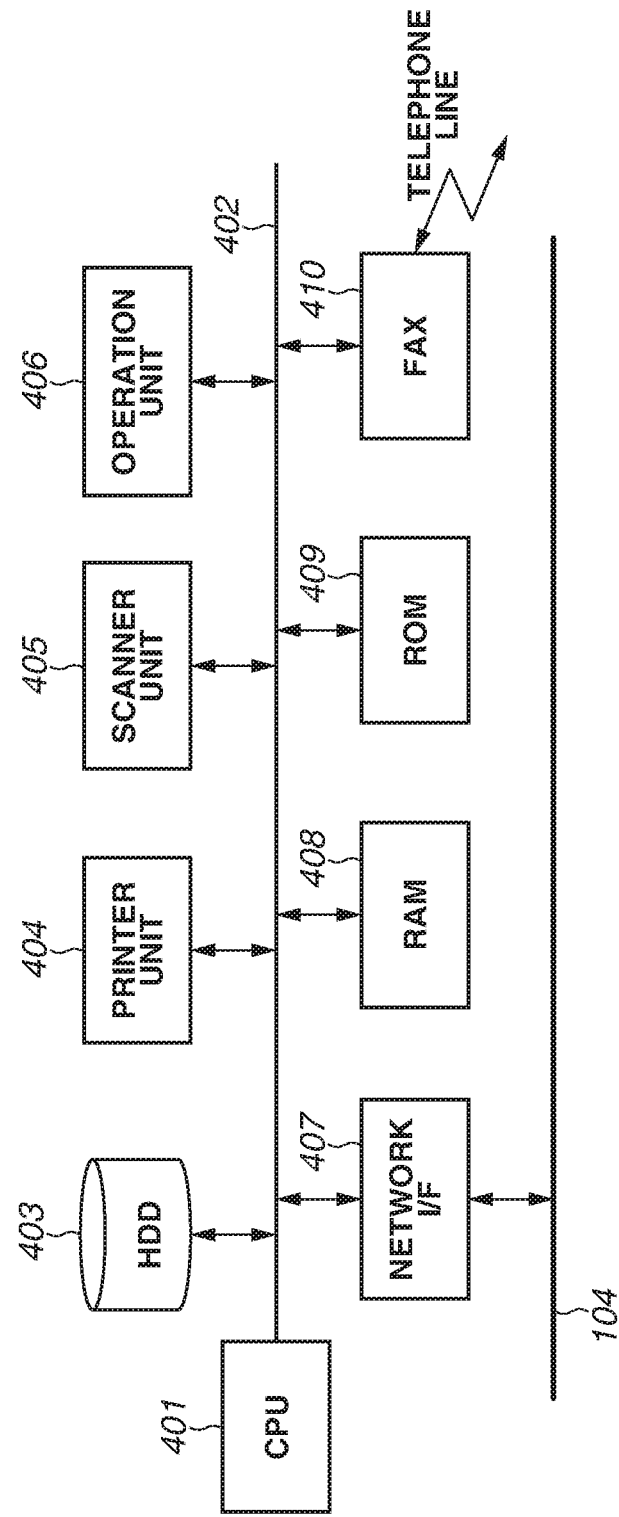
FIG. 2 is a block diagram illustrating a configuration of a multifunction peripheral (MFP) according to the present exemplary embodiment.

With reference to a block diagram in FIG. 2, the configuration of the MFP 103 is described.

The MFP 103 includes a central processing unit (CPU) 401, a hard disk drive (HDD) 403, a printer unit 404, a scanner unit 405, an operation unit 406, a network interface (I/F) 407, a random-access memory (RAM) 408, a read-only memory (ROM) 409, and a fax 410. These modules are connected to each other via a system bus 402.

The CPU 401 is a processor for controlling the entirety of the MFP 103. Based on a control program stored in the ROM 409, the CPU 401 performs overall control of access to various devices connected to the MFP 103.

The scanner unit 405 is an image input device. The scanner unit 405 scans an image of a document using an optical sensor, thereby acquiring scanned image data. The details of the scanner unit 405 will be described below with reference to FIG. 3.

The printer unit 404 is an image output device. Based on image data input from the scanner unit 405 or the PC 101, the printer unit 404 prints an image on a sheet. The details of the printer unit 404 will be described below with reference to FIG. 3.

The network I/F 407 is an interface for controlling communication with an external network. The network I/F 407 connects the MFP 103 to the network 104, and controls communication for transmitting image data input from the scanner unit 405 to the file sharing server 102 or the electronic mail server 105.

The HDD 403 mainly stores information (system software) necessary to cause a computer to start and operate, and image data.

The RAM 408 is a readable and writable memory. The RAM 408 is also a system work memory for the operation of the CPU 401. The RAM 408 stores image data input from the scanner unit 405 or the PC 101, various programs, and setting information.

The ROM 409 is a read-only memory. The ROM 409 is also a boot ROM. The ROM 409 stores a boot program for the system in advance.

The ROM 409 or the HDD 403 stores various control programs to be executed by the CPU 401 and required to perform various types of processing of flowcharts described below.

Further, the ROM 409 or the HDD 403 stores a program for performing rasterization.

The ROM 409 or the HDD 403 also stores a display control program for displaying various user interface screens (hereinafter, "UI screens") on a display unit (not illustrated) of the operation unit 406.

The CPU 401 reads a program stored in the ROM 409 or the HDD 403 and loads the read program into the RAM 408, thereby performing various operations according to the present exemplary embodiment.

The operation unit 406 corresponds to an example of a user interface unit. The operation unit 406 includes a display unit (not illustrated) and a key input unit (not illustrated). Further, the operation unit 406 has a function of receiving various settings from a user through the display unit or the key input unit.

Further, the operation unit 406 has a function of providing information for the user through the display unit. The display unit (not illustrated) includes a liquid crystal display (LCD: a liquid crystal display unit) and a touch panel sheet having a transparent electrode attached to the LCD (or using a capacitance method). On the LCD, an operation screen and a state of the MFP 103 are displayed. The key input unit includes, for example, a start key (not illustrated), which is used to give an instruction to start the execution of scanning or copying, and a stop key (not illustrated), which is used to give an instruction to stop the operation of scanning or copying.

The fax 410 transmits and receives electronic data via a telephone line.

Figure 3:
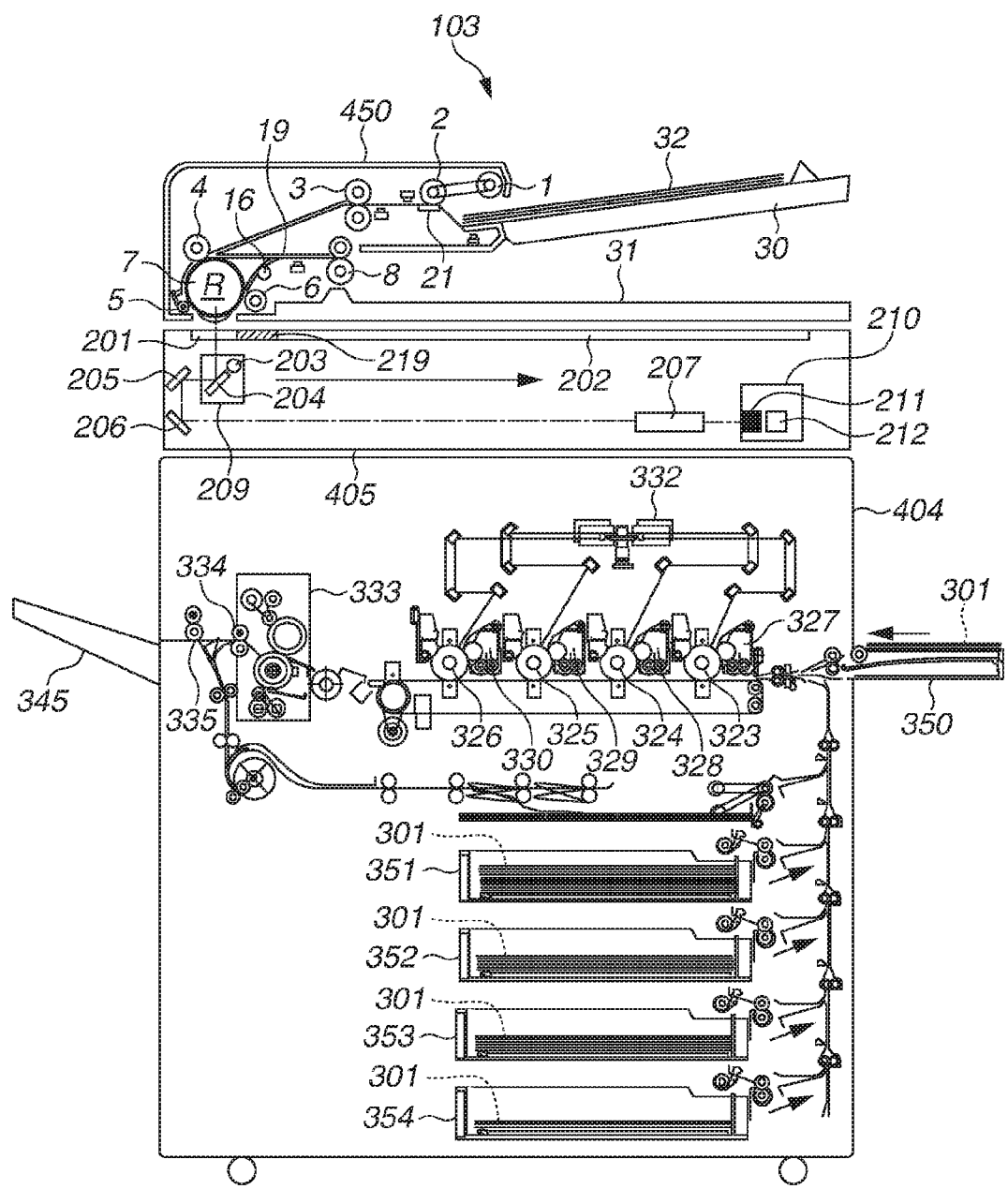
FIG. 3 is a cross-sectional view illustrating the configuration of the MFP according to the present exemplary embodiment.

Now, with reference to a cross-sectional view in FIG. 3, the configuration of the MFP 103 is described. The MFP 103 includes the scanner unit 405 and the printer unit 404.

With reference to the cross-sectional view in FIG. 3, an operation of the scanner unit 405 is described.

The scanner unit 405 includes an automatic document feeding unit 450. The automatic document feeding unit 450 includes a document tray 30 for stacking documents 32 and feeds each of the documents 32 placed on the document tray 30. Then, the scanner unit 405 reads an image of the fed document 32 at a position of a fixed optical system. This operation is specifically described below.

The automatic document feeding unit 450 includes the document tray 30, on which a bundle of documents including one or a plurality of documents 32 is stacked, a separation pad 21, which prevents the bundle of documents from protruding from the document tray 30 to advance downstream before conveyance of the documents 32 starts, and a feed roller 1.

The feed roller 1 falls on the document surface of the bundle of documents stacked on the document tray 30 and rotates. Consequently, the document 32 on the top surface of the bundle of documents is fed. The plurality of documents 32 fed by the feed roller 1 are separated and fed one by one by actions of a separation roller 2 and the separation pad 21. This separation is achieved by a known retard separation technique.

Each of the documents 32 separated by the separation roller 2 and the separation pad 21 is conveyed to a registration roller 4 by a pair of conveying rollers 3. Then, the conveyed document 32 is hit against the registration roller 4. Consequently, the document 32 is formed into a loop, thereby removing the skew of the conveyance of the document 32. Downstream of the registration roller 4, a feeding path for conveying in the direction of a skimming-through glass 201 the document 32 having passed through the registration roller 4 is placed.

The document 32 sent to the feeding path is sent onto a platen by a large roller 7 and a feed roller 5. At this time, the large roller 7 comes into contact with the skimming-through glass 201. The document 32 fed by the large roller 7 passes through a conveying roller 6 and moves between a roller 16 and a moving glass. Then, the document 32 is discharged to a document discharge tray 31 through a discharge flapper and discharge rollers 8.

The automatic document feeding unit 450 can read an image of the back surface of the document 32 by reversing the document 32. Specifically, in a state where the document 32 is inserted between the discharge rollers 8, the discharge rollers 8 are rotated backward to switch the discharge flapper, thereby moving the document 32 to a reverse path 19. The moved document 32 is hit against the registration roller 4 from the reverse path 19, and the document 32 is formed into a loop again, thereby removing the skew of the conveyance of the document 32. Then, the document 32 is moved to the skimming-through glass 201 again by the feed roller 5 and the large roller 7. Thus, it is possible to read an image of the back surface of the document 32 through the skimming-through glass 201.

The scanner unit 405 optically reads image information recorded on a document (not illustrated) placed on a document platen glass 202, by an optical scanner unit 209 scanning the document (not illustrated) in a sub-scanning direction indicated by an arrow in FIG. 3. On the other hand, the scanner unit 405 conveys the documents 32 on the document tray 30 one by one to a reading center position by the automatic document feeding unit 450. Then, the scanner unit 405 moves the optical scanner unit 209 to a reading center position of the large roller 7 of the automatic document feeding unit 450 and reads the document 32 at the reading center position of the large roller 7.

Then, the document 32 on the document tray 30 or the document (not illustrated) on the document platen glass 202 is read by the following optical system. This optical system includes the skimming-through glass 201, the document platen glass 202, the optical scanner unit 209, which includes an optical lamp 203 and a mirror 204, mirrors 205 and 206, a lens 207, and a charge-coupled device (CCD) sensor unit 210. In the present exemplary embodiment, the CCD sensor unit 210 includes a CCD (3-line sensor unit) 212 for reading a color image (red, green, and blue (RGB)) and a CCD (1-line sensor unit) 211 for reading a monochrome image.

The image information read by such optical system is photoelectrically converted and input as image data to the controller unit (not illustrated) of the MFP 103. In the present exemplary embodiment, a case has been described where the optical system included in the scanner unit 405 is a reduction optical system which forms an image of reflected light from the document 32 on a CCD sensor. The present invention, however, is not limited to this. Alternatively, the optical system included in the scanner unit 405 may be an equal-magnification optical system which forms an image of reflected light from the document 32 on a contact image sensor (CIS).

With reference to the cross-sectional view in FIG. 3, an operation of the printer unit 404 is described. The printer unit 404 performs an operation of outputting an image onto a sheet 301 based on image data transferred to the printer unit 404 (a printing operation). This operation is specifically described below.

Image data transferred to the printer unit 404 is converted into laser light according to the image data by a laser unit 322. Then, photosensitive drums (323 to 326) are irradiated with the laser light, thereby forming electrostatic latent images according to the image data on the photosensitive drums (323 to 326). To the portions of the latent images on the photosensitive drums (323 to 326), toner (a developer) is attached by developing units (327 to 330). A color printer includes four photosensitive drums (323 to 326) and four developing units (327 to 330) for cyan, yellow, magenta, and black.

Further, the printer unit 404 includes cassettes (351 to 354) and a manual feed tray 350 as a sheet holding unit (also referred to as a "sheet feeding stage").

The cassettes (351 to 354) have drawable shapes and can hold a plurality of (e.g., 600) sheets 301. On the other hand, the manual feed tray 350 has an insertable shape and can hold a plurality of (e.g., 100) sheets 301.

The printer unit 404 transfers the toner attached to the photosensitive drums (323 to 326) onto a sheet 301 fed from any one of the cassettes (351 to 354) and the manual feed tray 350. Then, the printer unit 404 conveys to a fixing unit 333 the sheet 301 onto which the toner has been transferred. The printer unit 404 fixes the toner onto the sheet 301 by heat and pressure. The sheet 301 having passed through the fixing unit 333 is discharged to a discharge tray 345 (a discharge unit) included in the MFP 103 by conveying rollers 334 and 335. If the MFP 103 does not include the discharge tray 345, the sheet 301 having passed through the fixing unit 333 is discharged into the body (a discharge unit) of the MFP 103.

A case has been described where the MFP 103 is a color printer including four photosensitive drums (323 to 326) and four developing units (327 to 330). The present invention, however, is not limited to this. Alternatively, the present invention can also be similarly applied to the MFP 103 that is a monochrome printer including a single photosensitive drum 326 and a single developing unit 330.

A description has been given of a method for printing an image on the sheet 301 by an electrophotographic method. The present invention, however, is not limited to this. Alternatively, the present invention can also be similarly applied to an ink-jet method or another method (e.g., a thermal transfer method) so long as the method can print an image on the sheet 301.

Figure 4:
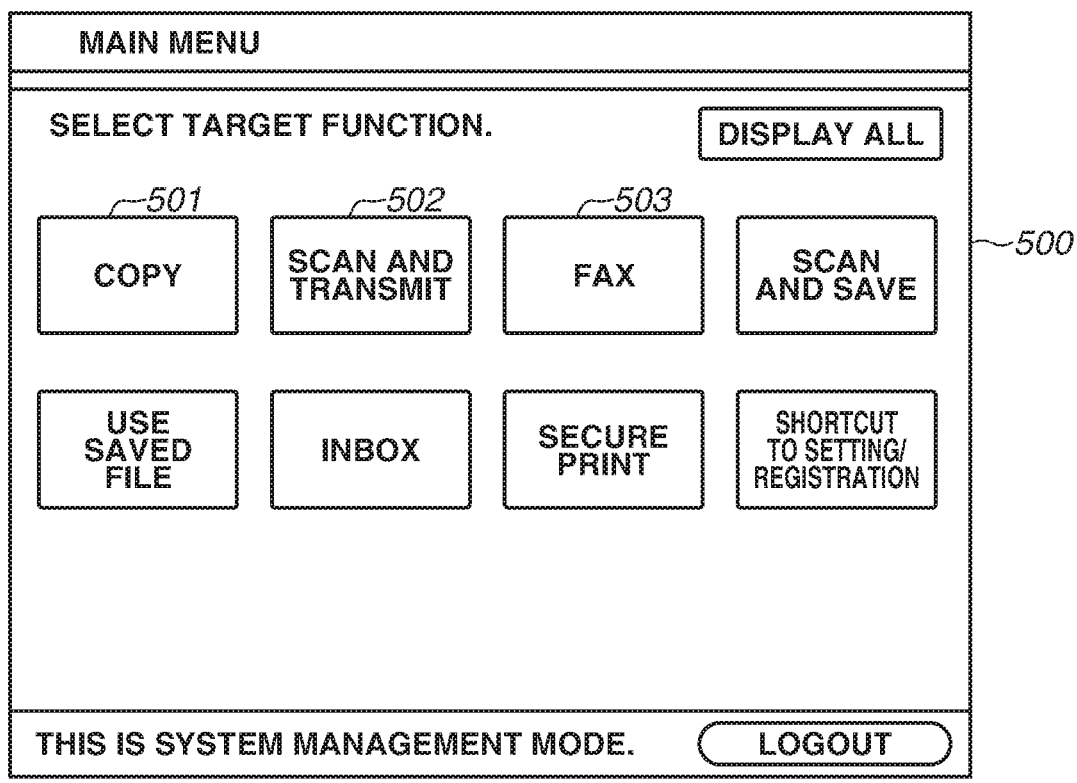
FIG. 4 is a diagram illustrating a configuration of a screen according to the present exemplary embodiment.

With reference to a configuration diagram in FIG. 4, a description is given of an example of a main screen 500, which is displayed on the operation unit 406.

On the main screen 500, buttons for calling various functions such as a copy function 501, a scan/transmission function 502, and a fax function 503 are displayed. The configuration is such that the user presses any one of the buttons on the main screen 500, thereby selecting one of the various functions such as the copy function 501, the scan/transmission function 502, and the fax function 503. Then, as a result of the user selecting any one of the various functions, the main screen 500 transitions to a screen for using one of the various functions.

For example, if the user selects the copy function 501, an execution screen for using the copy function 501 is displayed on the display unit of the operation unit 406. For example, if the user selects the fax function 503, an execution screen for using the fax function 503 is displayed on the display unit of the operation unit 406. For example, if the user selects the scan/transmission function 502, an execution screen 550 illustrated in FIG. 5 for transmitting image data generated by reading an image of a document (hereinafter referred to as "scanned image data") to any destination is displayed on the display unit of the operation unit 406.

Figure 5:
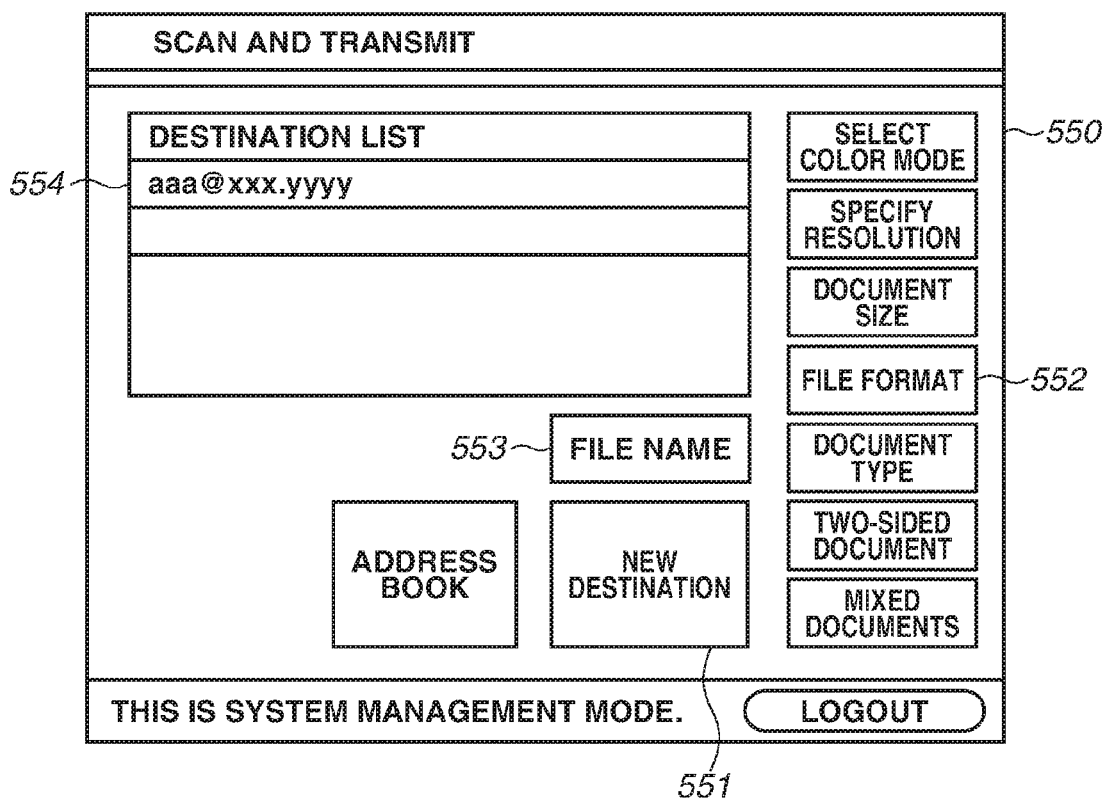
FIG. 5 is a diagram illustrating a configuration of a screen according to the present exemplary embodiment.

With reference to FIG. 5, the execution screen 550 displayed on the operation unit 406 is described.

On the execution screen 550, for example, a button 551 for specifying a destination to which image data acquired by scanning a document (hereinafter referred to as "scanned image data") is to be transmitted is displayed. Further, on the execution screen 550, for example, a button 552 for specifying a file format of the scanned image data and a button 553 for specifying a file name of the scanned image data are displayed.

Figure 6:
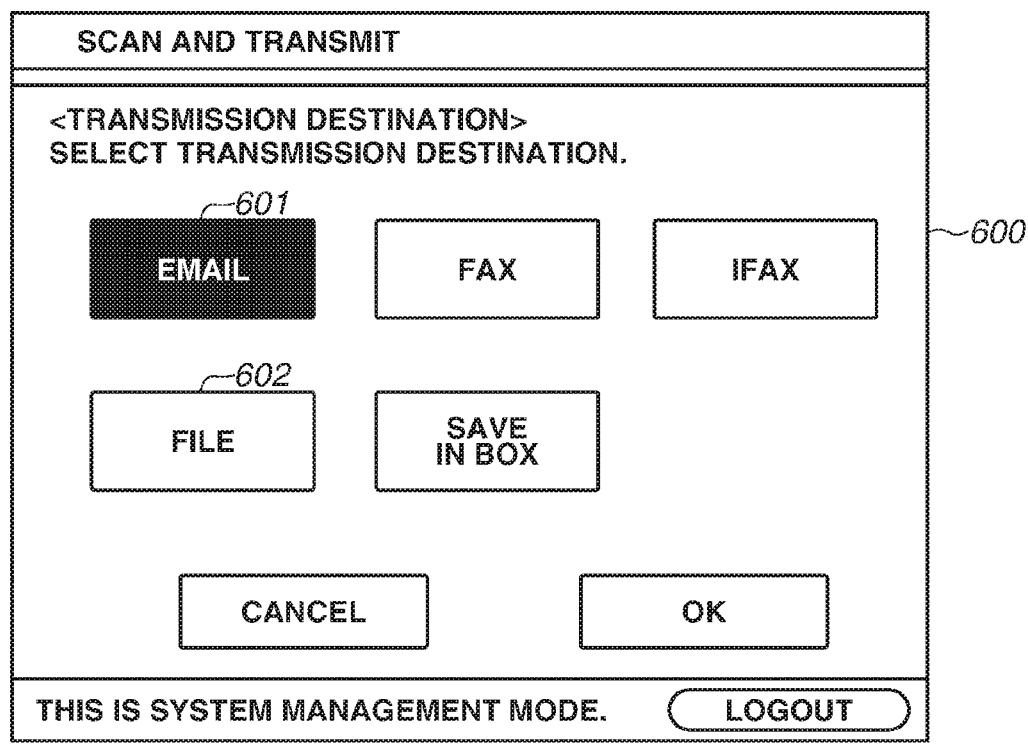
FIG. 6 is a diagram illustrating a configuration of a screen according to the present exemplary embodiment.

If the button 551 is pressed by the user, a setting screen 600 illustrated in FIG. 6 is displayed on the display unit of the operation unit 406. For example, to transmit the scanned image data by electronic mail, the user selects a button 601. The electronic mail is transmitted via the electronic mail server 105. Further, for example, to store the scanned image data as a file in the file sharing server 102, the user selects a button 602. In this case, the scanned image data is stored as a file in the file sharing server 102.

The user can specify a plurality of destinations as transmission destinations of the scanned image data through the setting screen 600. The transmission destinations specified by the user are displayed in a destination list 554 on the execution screen 550.

The information set on the setting screen 600 (the information regarding the transmission destinations of the scanned image data) is stored in the RAM 408.

Figure 7:
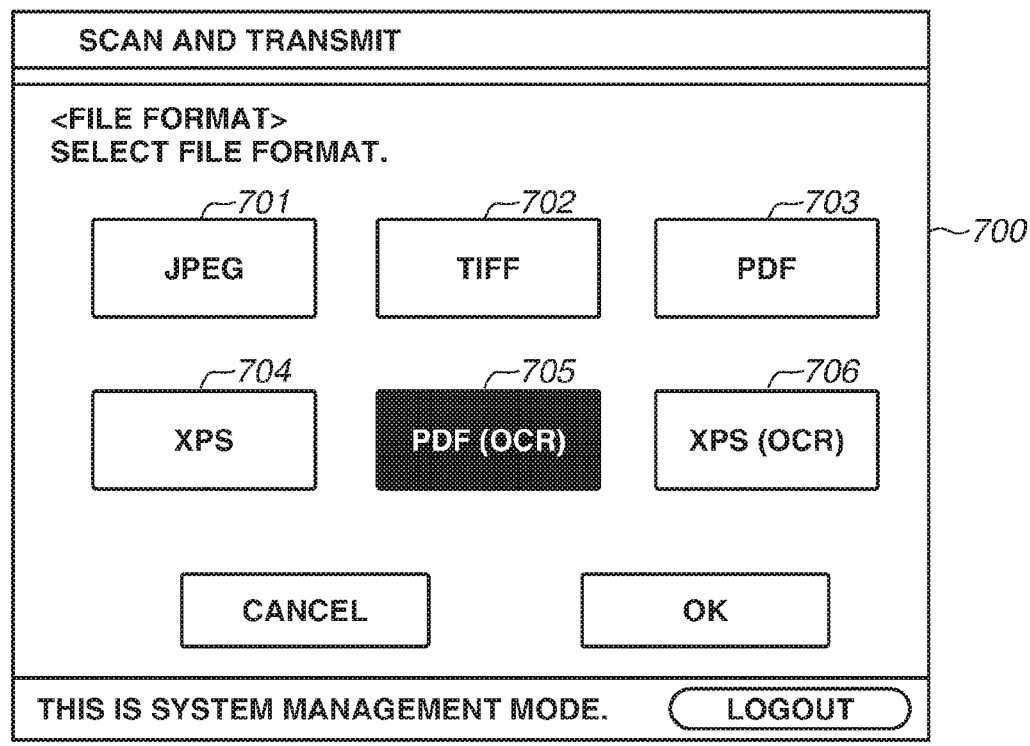
FIG. 7 is a diagram illustrating a configuration of a screen according to the present exemplary embodiment.

If, on the other hand, the button 552 is pressed by the user, a setting screen 700 illustrated in FIG. 7 is displayed on the display unit of the operation unit 406.

For example, to specify "JPEG" as a format of the scanned image data, the user selects a button 701. For example, to specify "TIFF" as a format of the scanned image data, the user selects a button 702. Further, for example, to specify "PDF" as a format of the scanned image data, the user selects a button 703. Furthermore, for example, to specify "XPS" as a format of the scanned image data, the user selects a button 704.

For example, to specify "PDF (OCR)" as a format of the scanned image data, the user selects a button 705. Further, for example, to specify "XPS (OCR)" as a format of the scanned image data, the user selects a button 706.

If "PDF (OCR)" or "XPS (OCR)" is specified as a format of the scanned image data, the CPU 401 performs a character recognition process on the scanned image data.

A known character recognition process is described.

An image recognition unit (not illustrated) included in the controller unit of the MFP 103 includes a pattern recognition unit, a character recognition unit, and an image data conversion unit. The pattern recognition unit is a processing unit for recognizing a character pattern in image data. The character recognition unit is a processing unit for generating a character code based on the character pattern recognized by the pattern recognition unit. The image data conversion unit is a processing unit for converting the character code into image data based on the recognition result of the character recognition unit.

The character recognition unit stores a dictionary for character recognition. The character recognition unit cuts out an image of a single character (a character pattern) in input character data, thereby recognizing a character. The recognition result recognized by the character recognition unit is stored in the HDD 403. The recognition result recognized by the character recognition unit is also supplied to the image data conversion unit. Then, a character code is converted into an output image, and further, the output image is stored in the HDD 403. In this case, regarding an unrecognizable character, its image information is stored as it is in the HDD 403. On the other hand, regarding a character for which a plurality of candidates are present, a plurality of pieces of character code information are stored in the HDD 403 in descending order of a recognition rate.

The CPU 401 adds text data (metadata) of the character recognized in the character recognition process to the image data as character information included in the scanned document. "OCR" means optical character recognition.

The information set on the setting screen 700 (the information regarding the file format of the scanned image data) is stored in the RAM 408.

Figure 8:
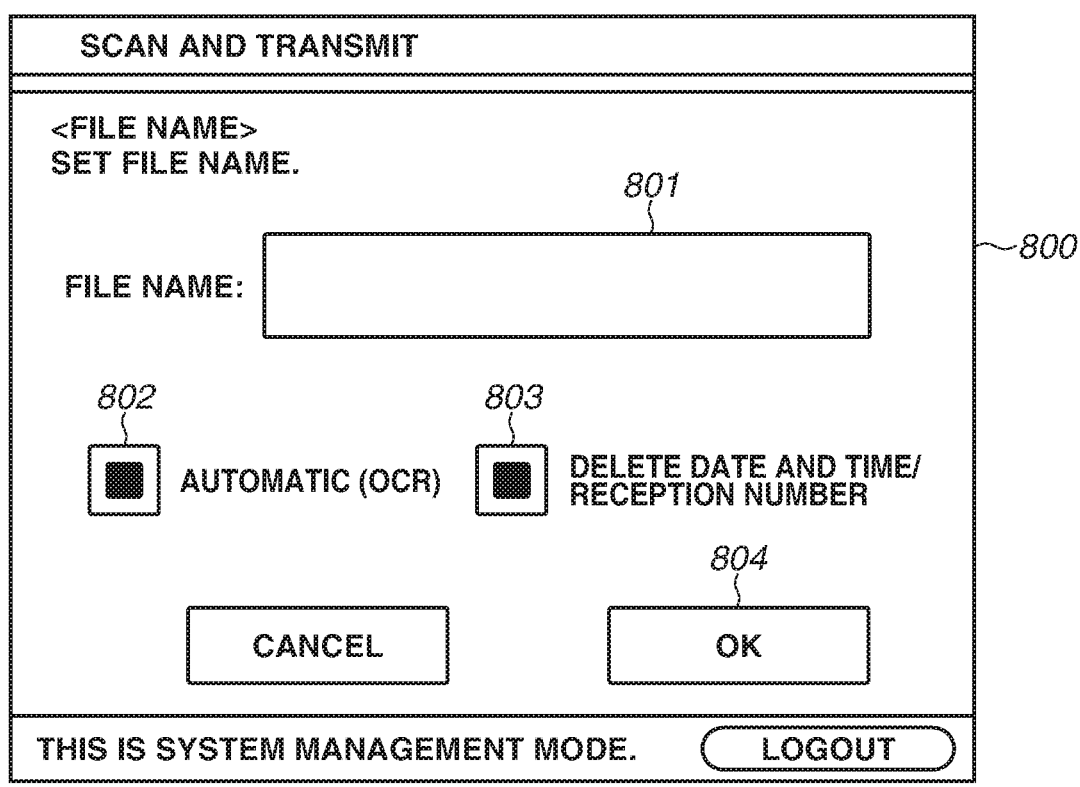
FIG. 8 is a diagram illustrating a configuration of a screen according to the present exemplary embodiment.

If, on the other hand, the button 553 is pressed by the user, a setting screen 800 illustrated in FIG. 8 is displayed on the display unit of the operation unit 406.

To add any character to a file name of an image file generated from the scanned image data, the user enters an arbitrary character into an entry form 801. The entered character is stored in the RAM 408 by the CPU 401.

Further, to add characters recognized by performing the character recognition process on the scanned image data to a file name of an image file generated from the scanned image data, the user presses a button 802. A mode regarding whether to add characters recognized in the character recognition process to a file name of an image file (hereinafter referred to as an "OCR mode") is switched from OFF to ON or from ON to OFF every time the button 802 is pressed by the user. When the OCR mode is ON, the characters recognized in the character recognition process are added to a file name of the image file. When the OCR mode is OFF, the characters recognized in the character recognition process are not added to a file name of the image file. On the setting screen 800, the OCR mode is set to OFF by default.

That is, the OCR mode is enabled if "PDF (OCR)" or "XPS (OCR)" is specified as a format of the scanned image data through the setting screen 700, or if the OCR mode is set to ON using the button 802. If the OCR mode is set to ON, and if the format specified through the setting screen 700 is "PDF", the format of the scanned image data may be automatically switched to "PDF (OCR)". Similarly, if the OCR mode is set to ON, and if the format specified through the setting screen 700 is "XPS", the format of the scanned image data may be automatically switched to "XPS (OCR)".

If the user is not to add a date and time or a reception number to a file name of an image file generated from the scanned image data, the user presses a button 803. A mode regarding whether to add a date and time or a reception number to the file name of the scanned image data (hereinafter referred to as a "date and time/reception number mode") is switched from ON to OFF or from OFF to ON every time the button 803 is pressed by the user. If the date and time/reception number mode is set to ON, characters representing unique information such as a date and time or a reception number are added to a file name of the scanned image data. On the setting screen 800, the date and time/reception number mode is set to ON by default.

For example, if the date and time/reception number mode is set to ON, and the scanned image data is to be stored as a file in the file sharing server 102, the CPU 401 adds, to a file name of the image file, characters representing the date and time when the reading of the image of the document starts. Consequently, the file name of the image file to be stored in the file sharing server 102 is a file name to which the characters representing the date and time are added. It is unlikely that the dates and times added to the file names of a plurality of image files stored in the file sharing server 102 are the same. Thus, even if a plurality of image files are stored in the file sharing server 102, it is unlikely that image files having the same file name are stored. Thus, image files are not overwritten due to having the same file name. Further, for example, if the date and time/reception number mode is set to ON, and if the scanned image data is to be transmitted by electronic mail, the CPU 401 adds, to a file name of the image file, characters representing a reception number of a job of transmitting the scanned image data to the electronic mail server 105. Consequently, the file name of the image file to be stored in the electronic mail server 105 is a file name to which the characters representing the reception number are added. Thus, even if a plurality of image files are received via the electronic mail server 105, the user can identify a desired image file by seeing the reception number added to the file name.

The information set on the setting screen 800 (the information regarding the setting of the file name of the image file) is stored in the RAM 408.

In the first exemplary embodiment, the document reading apparatus receives an instruction not to set characters representing unique information (e.g., a date and time or a reception number) as a file name of image data generated by reading an image of a document. Then, according to the reception of the instruction not to set characters representing unique information, the document reading apparatus sets a file name not including the characters representing unique information.

The details are described below.

Figure 9A:
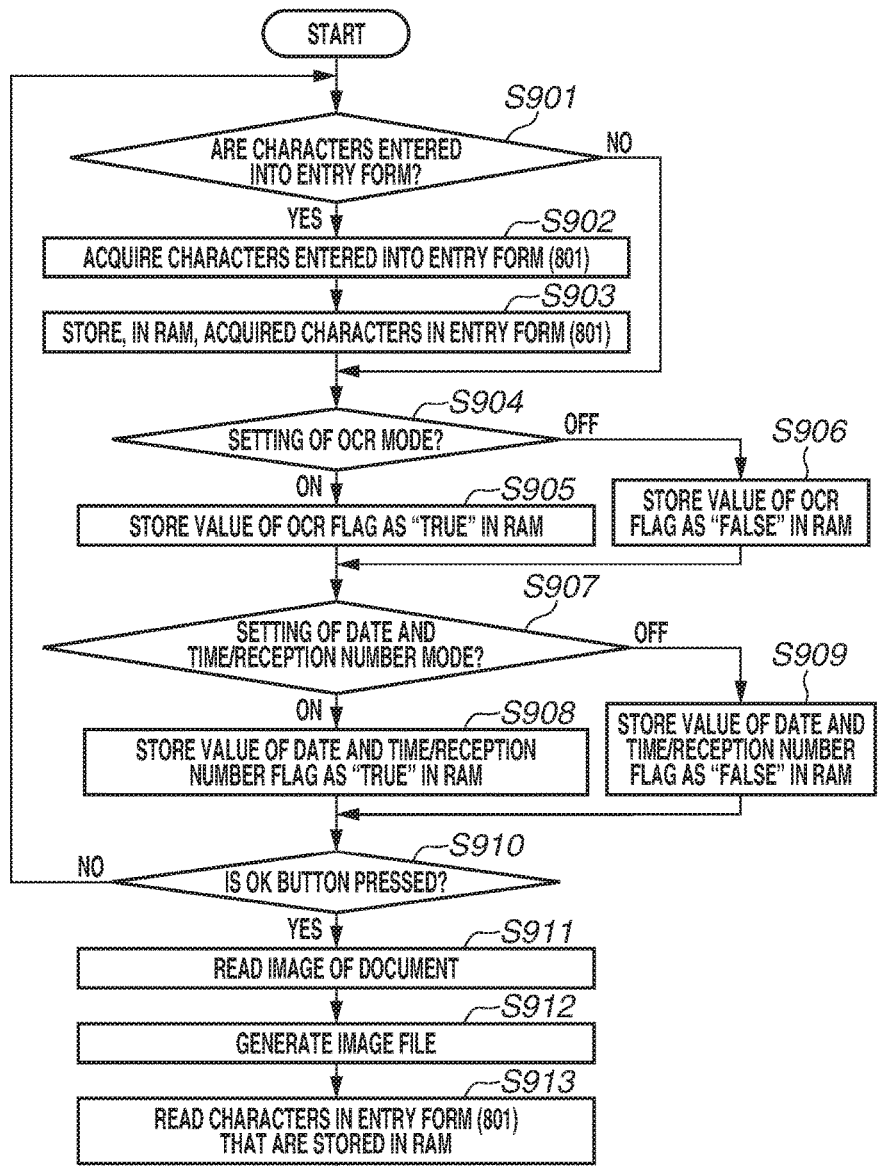
FIG. 9, composed of FIGS. 9A, 9B, and 9C, is a flowchart illustrating an example of control according to a first exemplary embodiment.
Figure 9C:
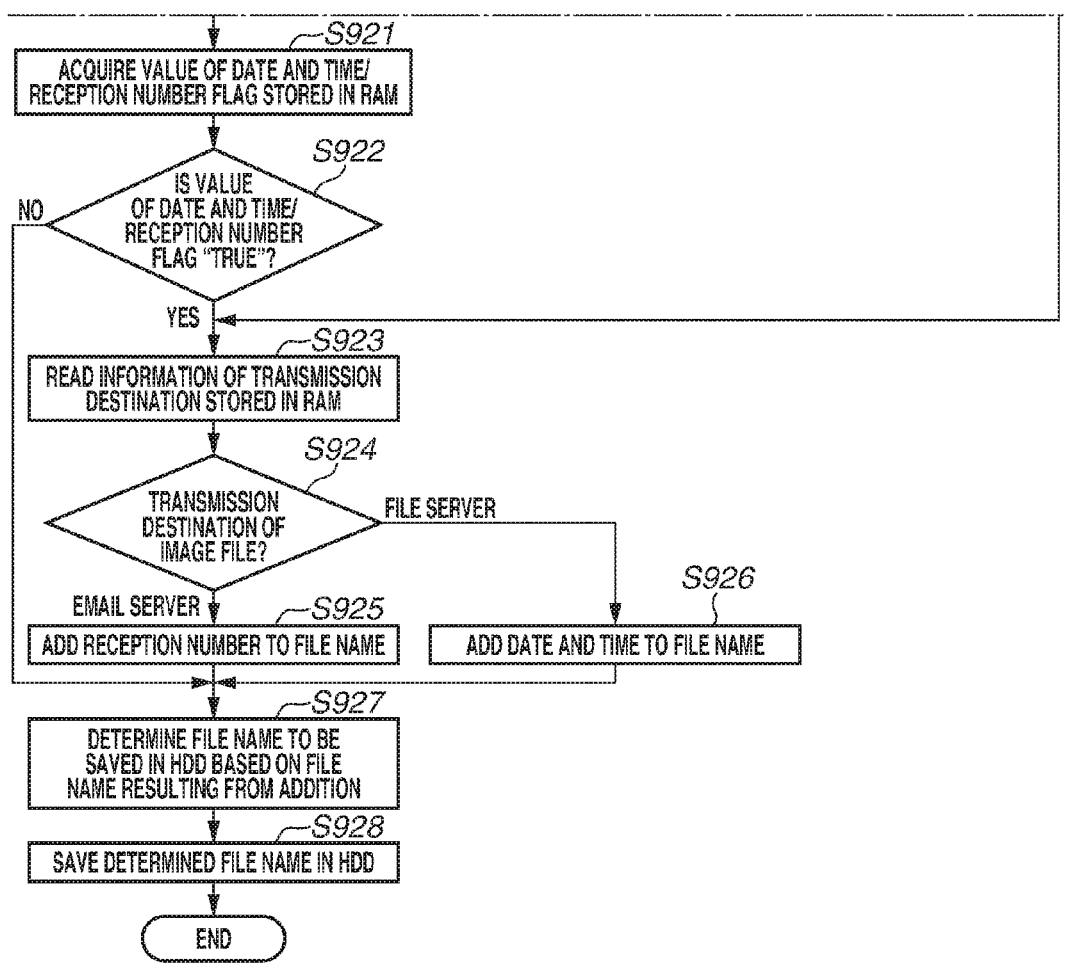

With reference to a flowchart illustrated in FIG. 9, composed of FIGS. 9A, 9B, and 9C, a description is given of a series of processes for adding a file name to an image file in the MFP 103 according to the first exemplary embodiment. This processing is performed by the CPU 401 executing a control program read from the ROM 409 or the HDD 403 and loaded into the RAM 408. The processing in FIG. 9 starts, for example, in a state where the setting screen 800 illustrated in FIG. 8 is displayed on the display unit of the operation unit 406. The processing in FIG. 9 starts, for example, in a state where the scan/transmission function 502 is selected through the main screen 500, and "PDF (OCR)" or "XPS (OCR)" is specified through the setting screen 700.

In step S901, first, the CPU 401 determines whether characters are entered into the entry form 801. If it is determined that characters are entered into the entry form 801 (Yes in step S901), then in step S902, the CPU 401 acquires the characters entered into the entry form 801. Then, in step S903, the CPU 401 stores in the RAM 408 the characters in the entry form 801 that have been acquired in step S902, and the processing proceeds to step S904. If, on the other hand, it is determined that characters are not entered into the entry form 801 (No in step S901), the processing proceeds to step S904.

In step S904, the CPU 401 determines whether the OCR mode is set to ON or OFF. If it is determined that the OCR mode is set to ON (ON in step S904), then in step S905, the CPU 401 stores the value of an OCR flag as "true" in the RAM 408. If, on the other hand, it is determined that the OCR mode is set to OFF (OFF in step S904), then in step S906, the CPU 401 stores the value of the OCR flag as "false" in the RAM 408.

The OCR flag is a flag for, if the character recognition process is performed on image data, adding characters recognized in the character recognition process to a file name of an image file. The value of the OCR flag is stored in the RAM 408 in association with the setting of a scan/transmission job.

In step S907, the CPU 401 determines whether the date and time/reception number mode is set to ON or OFF. If it is determined that the date and time/reception number mode is set to ON (ON in step S907), then in step S908, the CPU 401 stores the value of a date and time/reception number flag as "true" in the RAM 408. If, on the other hand, it is determined that the date and time/reception number mode is set to OFF (OFF in step S907), then in step S909, the CPU 401 stores the value of the date and time/reception number flag as "false" in the RAM 408.

The date and time/reception number flag is a flag for adding a date and time or a reception number to a file name of an image file according to a transmission destination of the image file. The value of the date and time/reception number flag is stored in the RAM 408 in association with the setting of the scan/transmission job.

In step S910, the CPU 401 determines whether an OK button 804 on the setting screen 800 is pressed. If it is determined that the OK button 804 is pressed (Yes in step S910), the processing proceeds to step S911. If, on the other hand, it is determined that the OK button 804 is not pressed (No in step S910), the processing returns to step S901.

In step S911, the CPU 401 instructs the scanner unit 405 to read an image of a document, and based on the reading instruction from the CPU 401, the scanner unit 405 reads the image of the document.

Then, in step S912, the scanner unit 405 generates scanned image data according to the reading of the image of the document, and the CPU 401 generates an image file from the scanned image data. The image file is generated by adding, to the scanned image data, information indicating a beginning of the file, header information, and information indicating an end of the file. The controller unit of the MFP 103 inputs the image data generated by the scanner unit 405 and then stores the image data in the RAM 408 or the HDD 403.

In step S913, the CPU 401 reads the characters in the entry form 801 that are stored in the RAM 408. Then, in step S914, the CPU 401 determines whether characters are present in the entry form 801.

If it is determined that characters are present in the entry form 801 (Yes in step S914), the processing proceeds to step S915. If, on the other hand, it is determined that characters are not present in the entry form 801 (No in step S914), the processing proceeds to step S929.

Here, the processes of step S915 and thereafter are described.

In step S915, the CPU 401 adds the characters in the entry form 801 to a file name. That is, in step S915, the CPU 401 generates the characters in the entry form 801 as the file name. For example, if "January 1" is entered into the entry form 801, the character string "January 1" is generated as the file name.

In step S916, the CPU 401 acquires the value of the OCR flag stored in the RAM 408. In step S917, the CPU 401 determines whether the value of the OCR flag is "true".

If it is determined that the value of the OCR flag is "true" (Yes in step S917), then in step S918, the CPU 401 performs the character recognition process on the image data stored in the RAM 408 or the HDD 403 (i.e., the image data generated in step S912). If, on the other hand, it is determined that the value of the OCR flag is "false" (No in step S917), the processing proceeds to step S921.

In step S919, the CPU 401 determines whether, as a result of the character recognition process performed in step S918, the recognition of characters is successful. As described above, if, based on the recognition result recognized by the character recognition unit, characters matching those registered in the dictionary for character recognition are not recognized, the CPU 401 determines that the recognition of characters is not successful. If, on the other hand, based on the recognition result recognized by the character recognition unit, characters matching those registered in the dictionary for character recognition are recognized, the CPU 401 determines that the recognition of characters is successful.

If it is determined that the recognition of characters is successful (Yes in step S919), then in step S920, the CPU 401 adds the characters recognized in the character recognition process to a file name. For example, if, as a result of performing the character recognition process on image data generated by reading an image of a document illustrated in FIG. 10, the characters "minutes" are recognized, the CPU 401 adds the character string "minutes" to a file name. If, on the other hand, it is determined that the recognition of characters is not successful (No in step S919), the processing proceeds to step S921.

If the characters in the entry form 801 are added to the file name in step S915, a character string obtained by joining the characters in the entry form 801 with the characters recognized in the character recognition process is added to a file name.

Figure 11A:
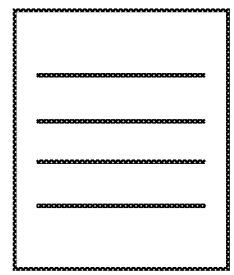
FIGS. 11A, 11B, 11C, and 11D illustrate examples of schematic diagrams of image files according to the first exemplary embodiment.

For example, if "the characters entered into the entry form 801" and "the characters recognized in the character recognition process" are to be added to a file name of the image file (steps S915 and S920), a character string obtained by joining the entered characters with the recognized characters is the file name. For example, suppose that "January 1" is entered into the entry form 801. Further, for example, suppose that, as a result of performing the character recognition process on image data generated by reading an image of a document illustrated in FIG. 10, the characters "minutes" are recognized. In this case, for example, as illustrated in FIG. 11A, "January 1_minutes.pdf" is the file name of the image file.

In step S921, the CPU 401 acquires the value of the date and time/reception number flag stored in the RAM 408. In step S922, the CPU 401 determines whether the value of the date and time/reception number flag is "true". If it is determined that the value of the date and time/reception number flag is "true" (Yes in step S922), then in step S923, the CPU 401 reads information of the transmission destination stored in the RAM 408.

In step S924, based on the information of the transmission destination read in step S923, the CPU 401 determines whether the transmission destination of the image file is an email server or a file server.

If it is determined that the transmission destination of the image file is an email server (e.g., the electronic mail server 105) (email server in step S924), then in step S925, the CPU 401 adds to a file name the reception number of the job of transmitting the image file to the email server. If no characters are added to the file name, the reception number of the job of transmitting the image file to the email server is generated as the file name. This enables the user to, for example, find out a desired file among image files received through the email server, by confirming the file name based on the reception number of the transmission.

If the date and time/reception number mode is set to ON, and the transmission destination of the image file is an email server, the CPU 401 may add, to a file name of the image file, characters representing the date and time when the reading of the image of the document starts. Alternatively, the CPU 401 may add, to a file name of the image file, a character string obtained by joining characters representing the date and time when the reading of the image of the document starts with characters representing the reception number of the job of transmitting the image file to the email server.

If, on the other hand, it is determined that the transmission destination of the image file is a file server (e.g., the file sharing server 102) (file server in step S924), then in step S926, the CPU 401 adds, to a file name, characters representing the date and time when the reading of the image of the document starts. If no characters are added to the file name, the characters representing the date and time when the reading of the image of the document starts are generated as the file name. This enables the user to, for example, find out a desired image file among image files stored in the file sharing server 102, by confirming the file name based on the date and time when the reading of the image of the document starts. Alternatively, in step S926, the CPU 401 may add, to a file name, characters representing the date and time when the transmission of the image file is to start.

If the date and time/reception number mode is set to ON, and the transmission destination of the image file is a file server, the CPU 401 may add, to a file name of the image file, characters representing the reception number of the job of transmitting the image file to the file server. Alternatively, the CPU 401 may add, to a file name of the image file, a character string obtained by joining characters representing the date and time when the reading of the image of the document starts, with characters representing the reception number of the job of transmitting the image file to the file server.

Figure 11B:
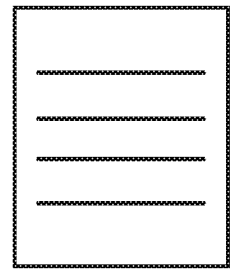

For example, in step S925, if only "the date and time" is to be added to a file name of the image file, "the date and time" is generated as the file name. For example, as illustrated in FIG. 11B, "20140101103030.pdf" is generated as the file name of the image file.

Figure 11C:
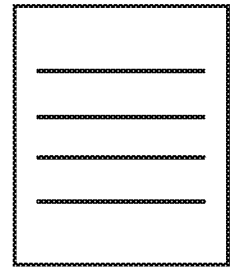

Further, for example, if "the characters recognized in the character recognition process" and "the date and time" are to be added to the file name of the image file (steps S920 and S925), a character string obtained by joining "the characters recognized in the character recognition process" with "the date and time" is the file name. For example, suppose that as a result of performing the character recognition process on image data generated by reading an image of a document illustrated in FIG. 10, the characters "minutes" are recognized. In this case, for example, as illustrated in FIG. 11C, "minutes_20140101103030.pdf" is the file name of the image file.

Then, in step S927, based on the file name resulting from the addition, the CPU 401 determines the file name to be saved in the HDD 403. In step S928, the CPU 401 saves the determined file name in the HDD 403.

Then, the processes of step S929 and thereafter are described.

In step S929, the CPU 401 acquires a value of the OCR flag stored in the RAM 408. In step S930, the CPU 401 determines whether the value of the OCR flag is "true".

If it is determined that the value of the OCR flag is "true" (Yes in step S930), then in step S931, the CPU 401 performs the character recognition process on the image data stored in the RAM 408 or the HDD 403 (i.e., the image data generated in step S912). If, on the other hand, it is determined that the value of the OCR flag is "false" (No in step S930), the processing proceeds to step S921.

In step S932, the CPU 401 determines whether, as a result of the character recognition process performed in step S931, the recognition of characters is successful. If it is determined that the recognition of characters is successful (Yes in step S932), then in step S933, the CPU 401 adds the characters recognized in the character recognition process to a file name. That is, in step S933, the CPU 401 generates as the file name the characters recognized in the character recognition process. After the process of step S933, the processing proceeds to step S921. If, on the other hand, it is determined that the recognition of characters in the character recognition process is not successful (No in step S932), the processing proceeds to step S934.

Figure 11D:
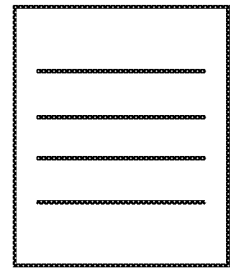

For example, in step S933, if only "the characters recognized in the character recognition process" are to be added to a file name of the image file, "the characters recognized in the character recognition process" are generated as the file name. For example, suppose that as a result of performing the character recognition process on image data generated by reading an image of a document illustrated in FIG. 10, the characters "minutes" are recognized. In this case, for example, as illustrated in FIG. 11D, "minutes.pdf" is generated as the file name of the image file.

In step S934, the CPU 401 acquires the value of the date and time/reception number flag stored in the RAM 408. In step S935, the CPU 401 determines whether the value of the date and time/reception number flag is "true". If it is determined that the value of the date and time/reception number flag is "true" (Yes in step S935), the processing proceeds to step S923.

If, on the other hand, it is determined that the value of the date and time/reception number flag is "false" (No in step S935), then in step S936, the CPU 401 stores the value of the date and time/reception number flag as "true" in the RAM 408, and the processing proceeds to step S921.

Even if the date and time/reception number mode is set to OFF (that is, an instruction not to add a date and time or a reception number to a file name is given) in the process of step S936, a date and time or a reception number is added to the file name if the recognition of characters in the character recognition process is not successful. Even if the date and time/reception number mode is set to OFF in the process of step S936, a date and time or a reception number may be added to the file name if characters recognized in the character recognition process are not added to the file name.

Then, in step S927, based on the file name resulting from the addition, the CPU 401 determines the file name to be saved in the HDD 403. In step S928, the CPU 401 saves the determined file name in the HDD 403.

This is the details of the series of processes for adding a file name to an image file in the MFP 103 according to the first exemplary embodiment.

If no characters are entered into the entry form 801, and the OCR mode is set to OFF, and the date and time/reception number mode is set to OFF, no file name will be added to the image file. In response, if no characters are entered into the entry form 801 (No in step S901), and the OCR mode is set to OFF (OFF in step S904), and the date and time/reception number mode is set to OFF (OFF in step S907), the OK button 804 may be grayed out. This can prevent the situation where no file name is added to the image file generated from the scanned image data.

In step S919, a case has been described where, if, based on the result of the character recognition, characters matching those registered in the dictionary for character recognition are not recognized, the CPU 401 determines that the recognition of characters is not successful. The present invention, however, is not limited to this. Alternatively, even if, based on the result of the character recognition, characters matching those registered in the dictionary for character recognition are recognized, the CPU 401 may determine that the recognition of characters is not successful if characters to be added to the file name of the image file are not recognized.

In the first exemplary embodiment, even if the date and time/reception number mode is set to OFF (OFF in step S907), and the recognition of characters in the character recognition process is not successful (No in step S932), the CPU 401 sets, as a file name, characters representing unique information such as a date and time or a reception number. For example, as illustrated in FIG. 11B, "20140101103030.pdf" is set as the file name of the image file.

As described above, in the first exemplary embodiment to which the present invention is applied, an example has been described where the document reading apparatus receives an instruction not to set characters representing unique information (e.g., a date and time or a reception number) as the file name of image data generated by reading an image of a document. Then, an example has been described where according to the reception of the instruction not to set characters representing unique information, the document reading apparatus sets the file name not including the characters representing unique information. Based on such an exemplary embodiment, it is possible to prevent the situation where an image file has a file name including only the extension and therefore is treated as a hidden file by an operating system of a server.

In the above first exemplary embodiment, an example has been described where, if it is determined that the date and time/reception number mode is set to OFF and it is determined that the recognition of characters in the character recognition process is not successful, characters representing unique information (e.g., a date and time or a reception number) are added to a file name.

In a second exemplary embodiment, an example is described where, if it is determined that the date and time/reception number mode is set to OFF and it is determined that the recognition of characters is not successful, "characters representing information indicating that characters to be added to a file name are not recognized" are added to a file name.

Figure 12C:
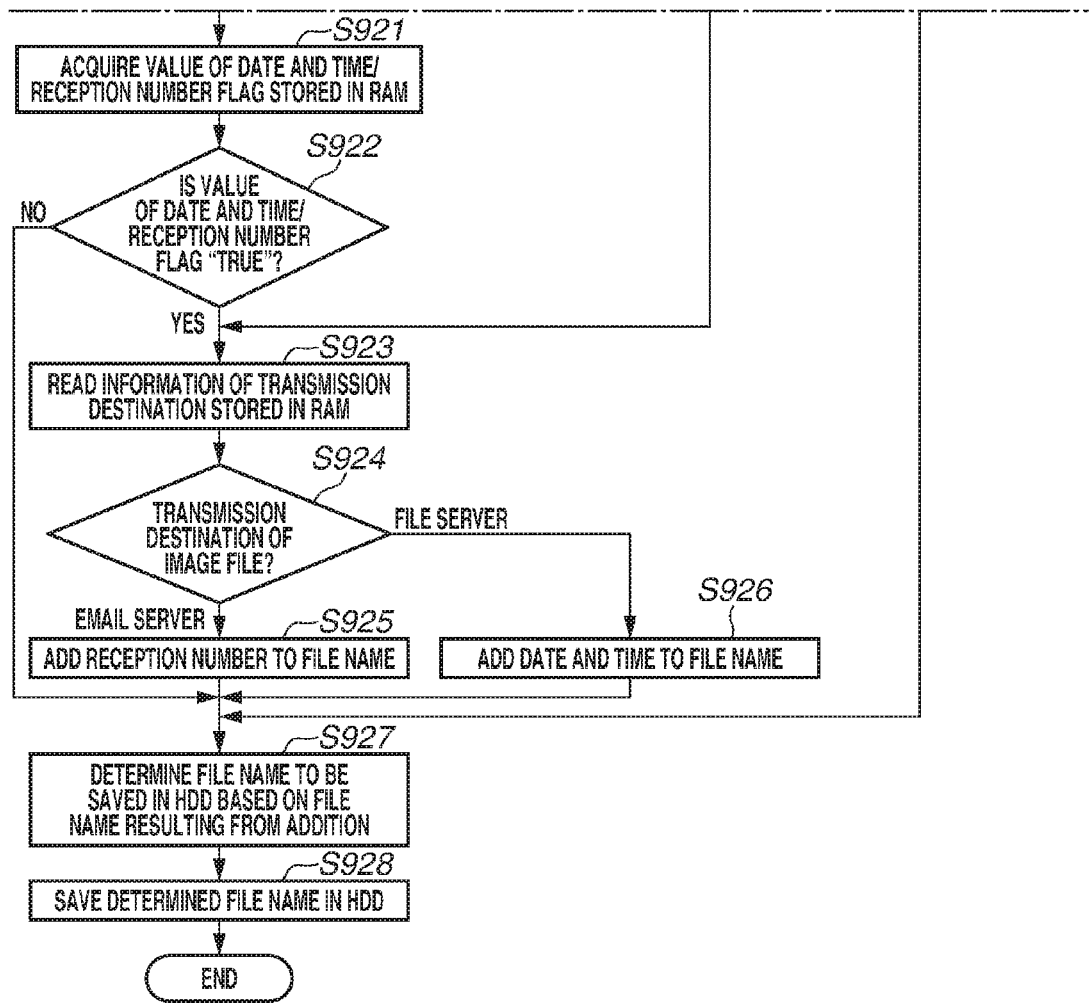
FIG. 12, composed of FIGS. 12A, 12B, and 12C, is a flowchart illustrating an example of control according to a second exemplary embodiment.

The MFP 103 according to the second exemplary embodiment is different from that according to the first exemplary embodiment (the example of control described above with reference to FIG. 9) in part of the series of processes for adding a file name to an image file. Thus, with reference to FIG. 12 which is composed of FIGS. 12A, 12B, and 12C, the processes different from those in the first exemplary embodiment are mainly described. The processes similar to those described with reference to FIG. 9 are designated by the same step numbers and therefore are not described in detail here.

If it is determined that the value of the OCR flag is "true" (Yes in step S930), then in step S931, the CPU 401 performs the character recognition process on the image data stored in the RAM 408 or the HDD 403 (i.e., the image data generated in step S912). If, on the other hand, it is determined that the value of the OCR flag is "false" (No in step S930), the processing proceeds to step S921.

In step S932, the CPU 401 determines whether, as a result of the character recognition process performed in step S931, the recognition of characters is successful. If it is determined that the recognition of characters is successful (Yes in step S932), then in step S933, the CPU 401 adds the characters recognized in the character recognition process to a file name, and the processing proceeds to step S921. If, on the other hand, it is determined that the recognition of characters in the character recognition process is not successful (No in step S932), the processing proceeds to step S934.

In step S934, the CPU 401 acquires the value of the date and time/reception number flag stored in the RAM 408. In step S935, the CPU 401 determines whether the value of the date and time/reception number flag is "true". If it is determined that the value of the date and time/reception number flag stored in the RAM 408 is "false" (No in step S935), then in step S1201, the CPU 401 adds "characters representing information indicating that characters to be added to a file name are not recognized" to the file name. That is, in step S1201, the CPU 401 generates the "characters representing information indicating that characters to be added to a file name are not recognized" as the file name. Then, after the process of step S1201, the processing proceeds to step S927.

In step S927, based on the file name resulting from the addition, the CPU 401 determines the file name to be saved in the HDD 403. In step S928, the CPU 401 saves the determined file name in the HDD 403.

Figure 13:
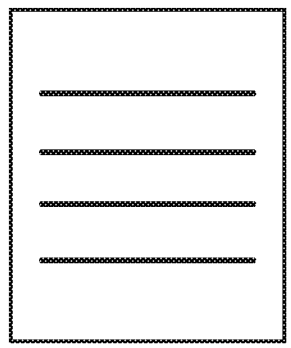
FIG. 13 illustrates an example of a schematic diagram of an image file according to the second exemplary embodiment.

That is, in the second exemplary embodiment, if the date and time/reception number mode is set to OFF, and the recognition of characters in the character recognition process is not successful, "characters representing information indicating that characters to be added to a file name are not recognized" are set as a file name. For example, if the characters set in step S1201 are "No OCR Name", then as illustrated in FIG. 13, "No OCR Name.pdf" is a file name of the image file. Alternatively, a character string different from "No OCR Name" or a sign may be added to a file name so long as the user can know that the recognition of characters in the character recognition process is not successful.

In the second exemplary embodiment to which the present invention is applied, an example has been described where, if an instruction not to set characters representing unique information as a file name is received, and characters are not recognized, "characters representing information indicating that characters to be added to a file name are not recognized" are added to the file name. Based on such an exemplary embodiment, it is possible to prevent the situation where an image file has a file name including only the extension and therefore is treated as a hidden file by an operating system of a server. Further, by seeing the file name, the user can know that the recognition of characters in the character recognition process is not successful.

In a third exemplary embodiment, first, characters representing unique information such as a date and time or a reception number are added to a file name. Next, if the value of the date and time/reception number flag stored in the RAM 408 is "false", the characters representing unique information such as a date and time or a reception number that are added to the file name are deleted, and then, the file name to be saved in the HDD 403 is determined. If, on the other hand, the value of the date and time/reception number flag stored in the RAM 408 is "true", a file name to be saved in the HDD 403 is determined without deleting the characters representing unique information such as a date and time or a reception number that are added to the file name.

Figure 14A:
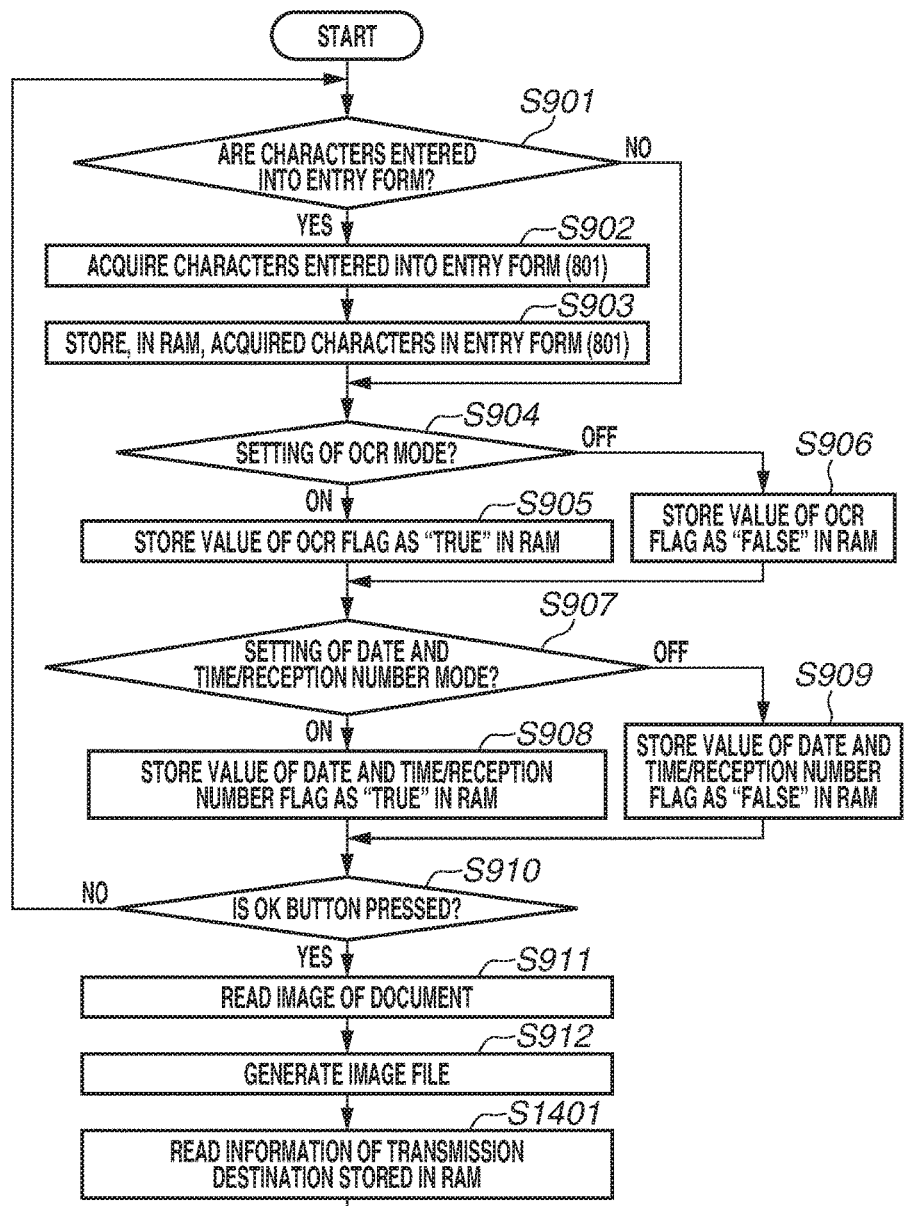
FIG. 14, composed of FIGS. 14A, 14B, and 14C, is a flowchart illustrating an example of control according to a third exemplary embodiment.
Figure 14B:
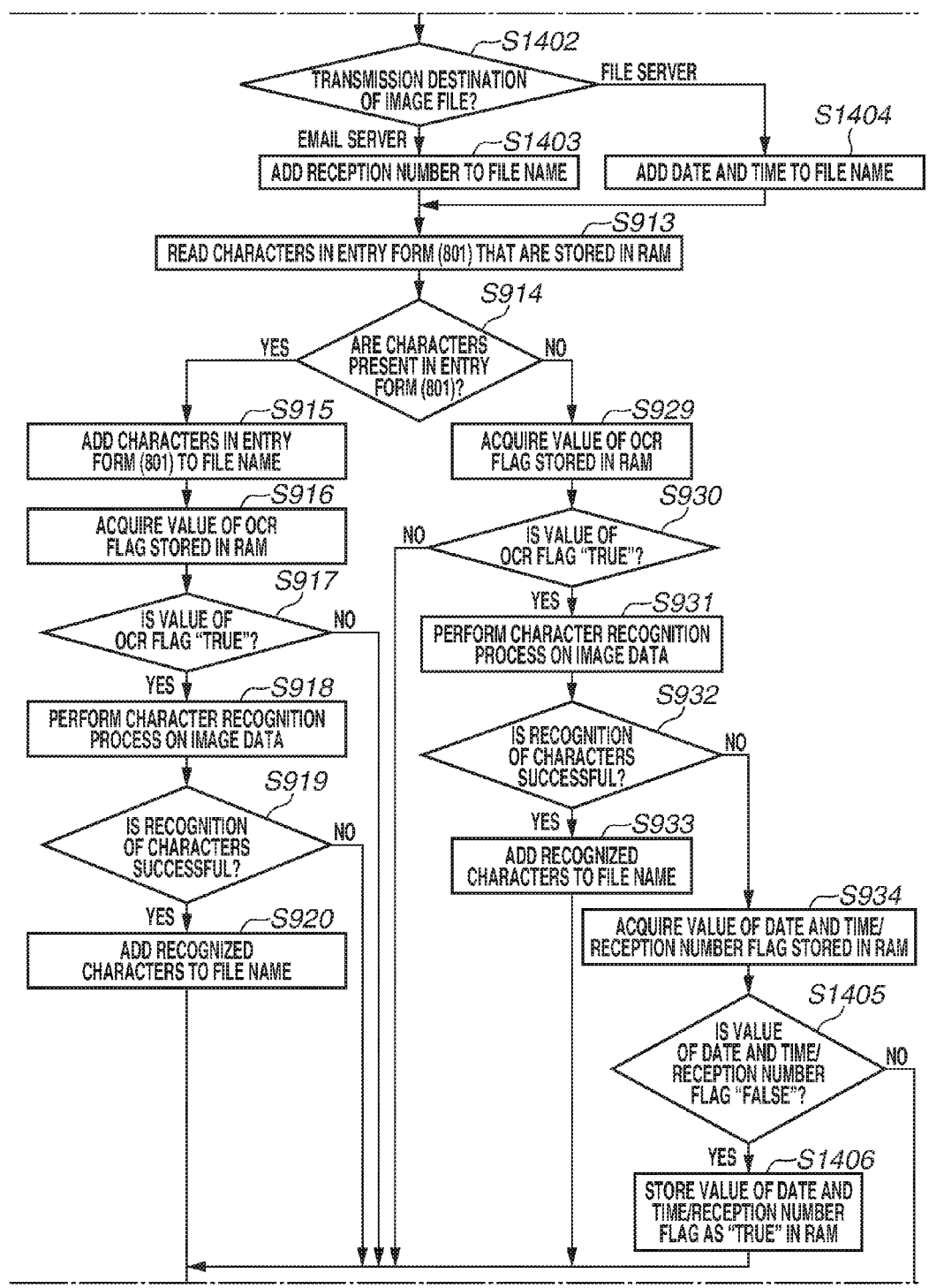
Figure 14C:
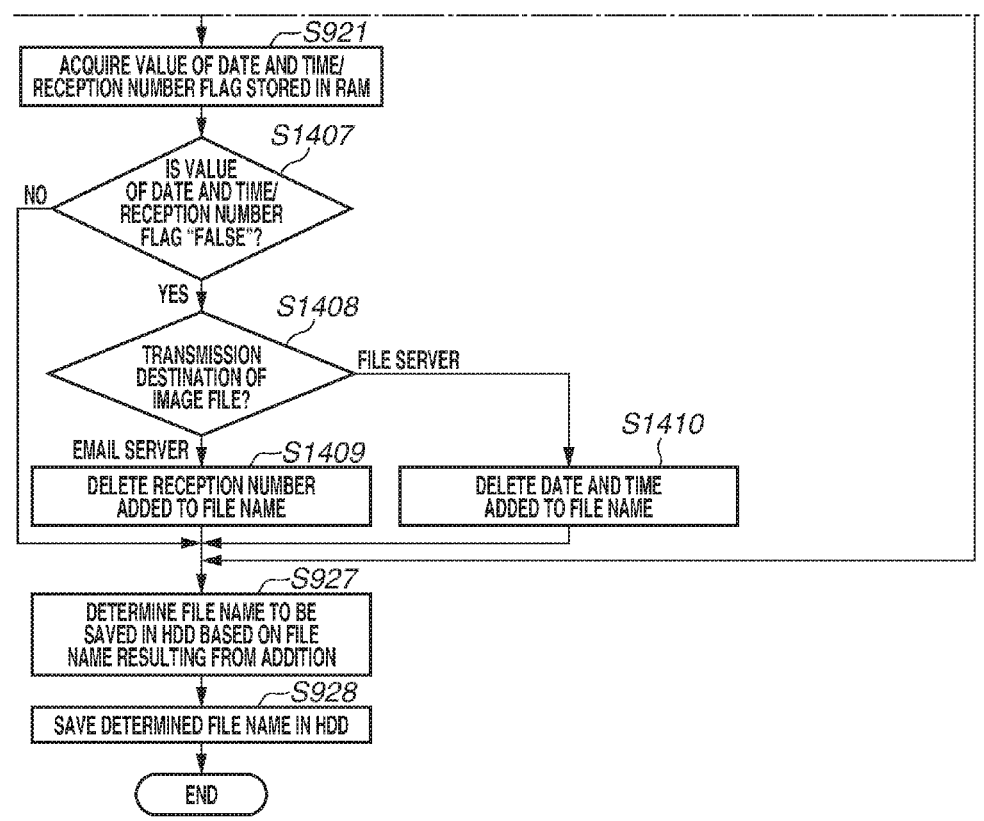

The MFP 103 according to the third exemplary embodiment is different from that according to the first exemplary embodiment (the example of control described above with reference to FIG. 9) in part of the series of processes for adding a file name to an image file. Thus, with reference to FIG. 14 which is composed of FIGS. 14A, 14B, and 14C, the processes different from those in the first exemplary embodiment are mainly described. The processes similar to those described with reference to FIG. 9 are designated by the same step numbers and therefore are not described in detail here.

After the process of step S912, then in step S1401, the CPU 401 reads information of the transmission destination stored in the RAM 408.

Then, in step S1402, based on the information of the transmission destination read in step S1401, the CPU 401 determines whether the transmission destination of the image file is an email server or a file server.

If it is determined that the transmission destination of the image file is an email server (e.g., the electronic mail server 105) (email server in step S1402), then in step S1403, the CPU 401 adds to a file name the reception number of the job of transmitting the image file to the email server. That is, in step S1403, the CPU 401 generates as the file name the reception number of the job of transmitting the image file to the email server. Alternatively, in step S1403, the CPU 401 may generate, as the file name, characters representing the date and time when the transmission of the image file is to start.

If the transmission destination of the image file is an email server, the CPU 401 may generate, as the file name of the image file, characters representing the date and time when the reading of the image of the document starts. Alternatively, the CPU 401 may generate, as the file name of the image file, a character string obtained by joining characters representing the date and time when the reading of the image of the document starts with characters representing the reception number of the job of transmitting the image file to the email server.

If, on the other hand, it is determined that the transmission destination of the image file is a file server (e.g., the file sharing server 102) (file server in step S1402), then in step S1404, the CPU 401 adds, to a file name, characters representing the date and time when the reading of the image of the document starts. That is, in step S1404, the CPU 401 generates, as the file name, characters representing the date and time when the reading of the image of the document starts.

If the transmission destination of the image file is a file server, the CPU 401 may generate, as the file name of the image file, characters representing the reception number of the job of transmitting the image file to the file server. Alternatively, the CPU 401 may generate, as the file name of the image file, a character string obtained by joining characters representing the date and time when the reading of the image of the document starts with characters representing the reception number of the job of transmitting the image file to the file server.

After the process of step S934, then in step S1405, the CPU 401 determines whether the value of the date and time/reception number flag stored in the RAM 408 is "false".

If it is determined that the value of the date and time/reception number flag stored in the RAM 408 is "false" (Yes in step S1405), then in step S1406, the CPU 401 stores the value of the date and time/reception number flag as "true" in the RAM 408, and the processing proceeds to step S921. If, on the other hand, it is determined that the value of the date and time/reception number flag stored in the RAM 408 is "true" (No in step S1405), the processing proceeds to step S927.

In step S927, based on the file name resulting from the addition, the CPU 401 determines the file name to be saved in the HDD 403. In step S928, the CPU 401 saves the determined file name in the HDD 403.

After the process of step S921, then in step S1407, the CPU 401 determines whether the value of the date and time/reception number flag stored in the RAM 408 is "false".

If it is determined that the value of the date and time/reception number flag stored in the RAM 408 is "true" (No in step S1407), the processing proceeds to step S927. If, on the other hand, it is determined that the value of the date and time/reception number flag stored in the RAM 408 is "false" (Yes in step S1407), then in step S1408, based on information of the transmission destination, the CPU 401 determines whether the transmission destination of the image file is an email server or a file server.

If it is determined that the transmission destination of the image file is an email server (e.g., the electronic mail server 105) (email server in step S1408), then in step S1409, the CPU 401 deletes the reception number added to the file name, and the processing proceeds to step S927. If, on the other hand, it is determined that the transmission destination of the image file is a file server (e.g., the file sharing server 102) (file server in step S1408), then in step S1410, the CPU 401 deletes the date and time added to the file name, and the processing proceeds to step S927.

In step S927, based on the file name resulting from the addition, the CPU 401 determines the file name to be saved in the HDD 403. In step S928, the CPU 401 saves the determined file name in the HDD 403.

Figure 15:
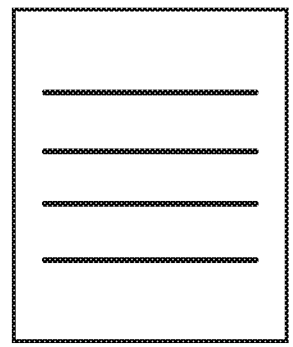
FIG. 15 illustrates an example of a schematic diagram of an image file according to the third exemplary embodiment.

That is, in the third exemplary embodiment, even if the date and time/reception number mode is set to OFF (OFF in step S907) and the recognition of characters in the character recognition process is not successful (NO in step S932), characters representing unique information such as a date and time or a reception number are added to a file name. For example, as illustrated in FIG. 15, "20140101103030.pdf" is set as a file name of the image file.

As described above, in the third exemplary embodiment to which the present invention is applied, an example has been described where the document reading apparatus receives an instruction not to set characters representing unique information (e.g., a date and time or a reception number) as the file name of image data generated by reading an image of a document. Then, an example has been described where, according to the reception of the instruction not to set characters representing unique information, the document reading apparatus sets a file name not including the characters representing unique information. Based on such an exemplary embodiment, it is possible to prevent the situation where an image file has a file name including only the extension and therefore is treated as a hidden file by an operating system of a server.

The present invention is not limited to the above exemplary embodiments. Various modifications (including the organic combinations of the exemplary embodiments) can be made based on the spirit of the present invention, but are not excluded from the scope of the present invention.

In the above exemplary embodiments, a case has been described where, if the button 553 is pressed by the user, the setting screen 800 illustrated in FIG. 8 is displayed on the display unit of the operation unit 406. An example has been described where, if the user is not to add a date and time or a reception number to a file name of an image file generated from the scanned image data, the user presses the button 803 on the setting screen 800. An example has been described where the date and time/reception number mode is switched from ON to OFF or from OFF to ON every time the button 803 is pressed by the user. Further, an example has been described where, on the setting screen 800, the date and time/reception number mode is set to ON by default.

Figure 16:
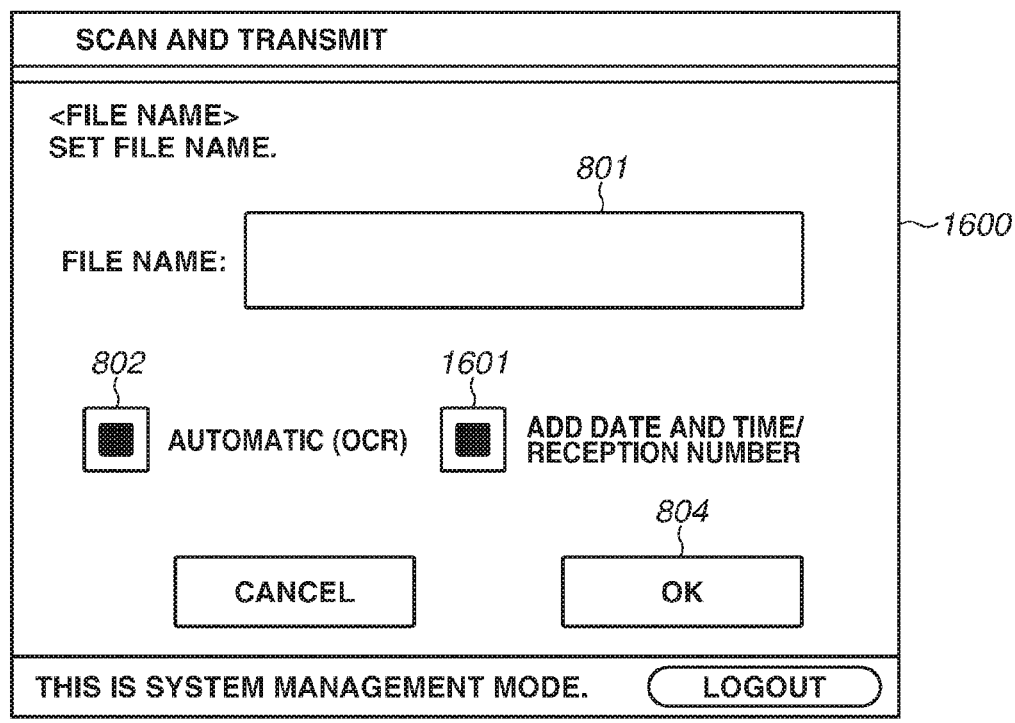
FIG. 16 is a diagram illustrating a configuration of a screen according to another exemplary embodiment.

In another exemplary embodiment, if the button 553 is pressed by the user, a setting screen 1600 illustrated in FIG. 16 may be displayed on the display unit of the operation unit 406. If the user is to add a date and time or a reception number to a file name of an image file generated from the scanned image data, the user may press a button 1601 on the setting screen 1600. The date and time/reception number mode is switched from ON to OFF or from OFF to ON every time the button 1601 is pressed by the user. Then, on the setting screen 1600, the date and time/reception number mode may be set to OFF by default.

That is, in the first, second, and third exemplary embodiments, examples have been described where an instruction to delete a date and time or a reception number is received from the user through the setting screen 800 in FIG. 8. The present invention, however, is not limited to this. As a variation of the first, second, and third exemplary embodiments, an instruction to add a date and time or a reception number may be received from the user through the setting screen 1600 in FIG. 16.

Further, for example, in the present exemplary embodiments, the CPU 401 of the controller unit of the MFP 103 performs the above various types of control. The present invention, however, is not limited to this. Alternatively, a print control apparatus such as an external controller having a housing separate from the MFP 103 may be configured to perform some or all of the above various types of control.

Furthermore, the exemplary embodiments to which the present invention is applied have been described using the MFP 103 that includes the scanner unit 405 and the printer unit 404. The present invention, however, is not limited to this. Alternatively, the exemplary embodiments to which the present invention is applied can be similarly described also using a document reading apparatus that does not include the printer unit 404 but includes the scanner unit 405.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080443, filed Apr. 9, 2015, which is hereby incorporated by reference herein in its entirety.

What is claimed is:

1. A processing method in a document reading apparatus that includes a scanner configured to generate image data by reading an image of a document, the processing method comprising:
   prompting input, to be supplied by a user, of characters to be included in a file name of the image data generated by the scanner;
   performing character recognition on the image data generated by the scanner to recognize characters from the image data;
   receiving, from the user, a setting relating to whether characters representing unique information is included in a file name of the image data generated by the scanner; and
   setting in a case where characters to be included in a file name are input by the user and the character recognition performed on the image data is successful, according to the received setting, a file name that includes the characters input by the user, the characters recognized from the image data and the characters representing the unique information or a file name that includes the characters input by the user and the characters recognized from the image data and does not include the characters representing the unique information, as the file name of the image data,
   wherein in a case where characters to be included in a file name are not input by the user,
      if the character recognition performed on the image data is successful, a file name that includes the characters representing the unique information or a file name that does not include the characters representing the unique information is set according to the received setting, and
      if the character recognition performed on the image data is not successful, a file name that includes the characters representing the unique information is set regardless the received setting.

2. The processing method according to claim 1, wherein, in a case where the character recognition performed on the image data is not successful, a file name including the characters representing the unique information is set even in a case where a setting for not including characters representing the unique information in a file name is received.

3. The processing method according to claim 1, wherein, in a case where a setting for not including characters representing the unique information in a file name is received and if the character recognition performed on the image data is not successful, a file name including characters indicating that characters to be set as a file name are not recognized is set.

4. The processing method according to claim 1, wherein the unique information is a date and time of when reading of an image of a document is executed by the scanner.

5. The processing method according to claim 1, wherein the unique information is a reception number of a job of transmitting the image data, generated by the scanner, to an external apparatus.

6. A document reading apparatus comprising:
   a scanner configured to generate image data by reading an image of a document;
   at least one memory that stores a set of instructions; and
   at least one processor that executes the instructions to:
   prompt input, to be supplied by a user, of characters to be included in a file name of the image data generated by the scanner;
   perform character recognition on the image data generated by the scanner to recognize characters from the image data;
   receive, from the user, a setting relating to whether characters representing unique information is included in a file name of the image data generated by the scanner; and
   set in a case where characters to be included in a file name are input by the user and the character recognition performed on the image data is successful, according to the received setting, a file name that includes the characters input by the user, the characters recognized from the image data and the characters representing the unique information or a file name that includes the characters input by the user and the characters recognized from the image data and does not include the characters representing the unique information, as the file name of the image data
   wherein in a case where characters to be included in a file name are not input by the user,
      if the character recognition performed on the image data is successful, a file name that includes the characters representing the unique information or a file name that does not include the characters representing the unique information is set according to the received setting, and if the character recognition performed on the image data is not successful, a file name that includes the characters representing the unique information is set regardless the received setting.

7. A non-transitory computer-readable storage medium storing a program for causing a computer to execute a processing method of a document reading apparatus that includes a scanner configured to generate image data by reading an image of a document, the program comprising:

code to prompt input, to be supplied by a user, of characters to be included in a file name of the image data generated by the scanner;

code to perform character recognition on the image data generated by the scanner to recognize characters from the image data;

code to receive from the user, a setting relating to whether characters representing unique information is included in a file name of the image data generated by the scanner; and code to set in a case where characters to be included in a file name are input by the user and the character recognition performed on the image data is successful, according to the received setting, a file name that includes the characters input by the user, the characters recognized from the image data, and the characters representing the unique information or a file name that includes the characters input by the user and the characters recognized from the image data and does not include the characters representing the unique information, as the file name of the image data, wherein in a case where characters to be included in a file name are not input by the user, if the character recognition performed on the image data is successful, a file name that includes the characters representing the unique information or a file name that does not include the characters representing the unique information is set according to the received setting, and if the character recognition performed on the image data is not successful, a file name that includes the characters representing the unique information is set regardless the received setting.

8. The processing method according to claim 1, wherein in a case where characters to be included in a file name are input by the user and the character recognition performed on the image data is not successful, a file name that includes the characters representing the unique information or a file name that does not include the characters representing the unique information is set according to the received setting.

9. The processing method according to claim 1,
wherein a setting for including the characters representing the unique information in a file name is set as a default setting in the document reading apparatus, and
wherein the document reading apparatus is capable of receiving, from the user, a change to a setting for not including the characters representing the unique information in a file name.

10. The processing method according to claim 1,
wherein a setting for not including the characters representing the unique information in a file name is set as a default setting in the document reading apparatus, and
wherein the document reading apparatus is capable of receiving, from the user, a change to a setting for including the characters representing the unique information in a file name.

11. The processing method according to claim 1, wherein in a case where the image data generated by the scanner is to be transmitted to a mail server, a date and time of when reading of an image of a document is executed by the scanner is used as the unique information, and in a case where the image data generated by the scanner is to be transmitted to a file server, a reception number of a job of transmitting the image data, generated by the scanner, to an external apparatus is used as the unique information.

12. The processing method according to claim 1, wherein the document reading apparatus is capable of receiving, from the user, a setting relating to whether the characters recognized from the image data are included in a file name of the image data generated by the scanner.

* * * * *